(12) United States Patent
Dluhos et al.

(10) Patent No.: US 9,442,459 B2
(45) Date of Patent: Sep. 13, 2016

(54) MAKING HOLOGRAPHIC DATA OF COMPLEX WAVEFORMS

(71) Applicants: Eric John Dluhos, Mifflinburg, PA (US); Bradley Lloyd Wilk, Pacific Grove, CA (US)

(72) Inventors: Eric John Dluhos, Mifflinburg, PA (US); Bradley Lloyd Wilk, Pacific Grove, CA (US)

(*) Notice: Subject to any disclaimer, the term of this patent is extended or adjusted under 35 U.S.C. 154(b) by 158 days.

(21) Appl. No.: 13/987,505

(22) Filed: Jul. 15, 2013

(65) Prior Publication Data
US 2014/0160542 A1   Jun. 12, 2014

Related U.S. Application Data

(63) Continuation-in-part of application No. 13/987,337, filed on Jul. 13, 2013, now abandoned.

(60) Provisional application No. 61/741,160, filed on Jul. 13, 2012.

(51) Int. Cl.
| | |
|---|---|
| *G03H 1/10* | (2006.01) |
| *G03H 1/08* | (2006.01) |
| *G03H 1/04* | (2006.01) |
| *G03H 1/00* | (2006.01) |
| *G03H 1/02* | (2006.01) |

(52) U.S. Cl.
CPC .............. *G03H 1/0005* (2013.01); *G03H 1/04* (2013.01); *G03H 2001/0204* (2013.01); *G03H 2222/23* (2013.01)

(58) Field of Classification Search
CPC .... G03H 1/2294; G03H 1/08; G03H 1/0005; G03H 2001/0224; G03H 1/22; G03H 2001/0816; G03H 1/0841; G03H 1/0402; G03H 1/041; G03H 2226/02; G03H 2001/2244; G03H 2001/0038; G03H 2001/2255; G03H 2225/30; G02F 2203/12; G02F 1/00
USPC ................ 359/9, 10, 11, 21, 24, 29, 32, 35
See application file for complete search history.

(56) References Cited

U.S. PATENT DOCUMENTS

| | | | | |
|---|---|---|---|---|
| 3,519,323 | A * | 7/1970 | Collier ..................... | G03H 1/12 359/11 |
| 3,838,904 | A * | 10/1974 | Takeda et al. .................. | 359/29 |
| 3,917,380 | A * | 11/1975 | Kato et al. ...................... | 359/35 |
| 6,075,895 | A * | 6/2000 | Qiao et al. ..................... | 382/218 |
| 6,762,865 | B1 * | 7/2004 | Edwards ......................... | 359/29 |
| 2008/0246759 | A1* | 10/2008 | Summers ...................... | 345/420 |
| 2015/0015928 | A1* | 1/2015 | Dluhos et al. .................... | 359/9 |

* cited by examiner

*Primary Examiner* — Jade R Chwasz
(74) *Attorney, Agent, or Firm* — Quine Intellectual Property Law Group P.C.

(57) ABSTRACT

Method of Fast Fourier Transform (FFT) Analysis for collecting waveforms and other vibrational intelligence and modulating or embedding same into one or more coherent reference beams of an n-dimensional holographic recording device for producing one or more holograms of objects, including singularity points in space. The result provides wholesale differentiation of waveforms distinguishable from others based on their spectral characteristics. When said holograms are presented with reference beams of vibrational waveforms having similar characteristics to those which were present during recording of the original objects, phantoms of the original objects or subjects will reconstruct themselves in space with an energy glow of intensity that varies thusly with the degree of similarity between the waveform modulations of the reconstructing wavefronts and those of that same which were used to originally record said objects. Said n-dimensional description space can be sampled of the said glowing phantoms.

10 Claims, 24 Drawing Sheets

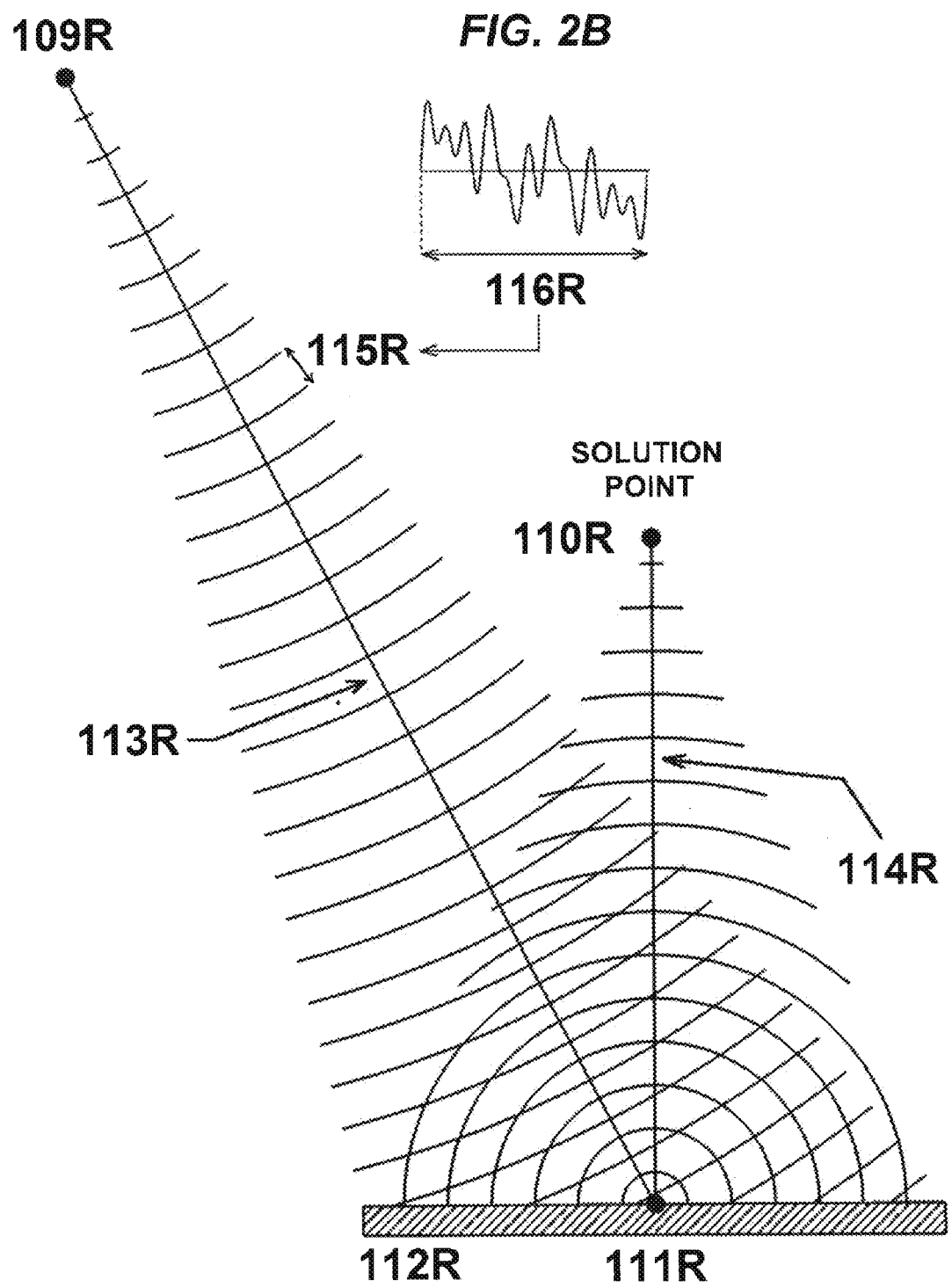

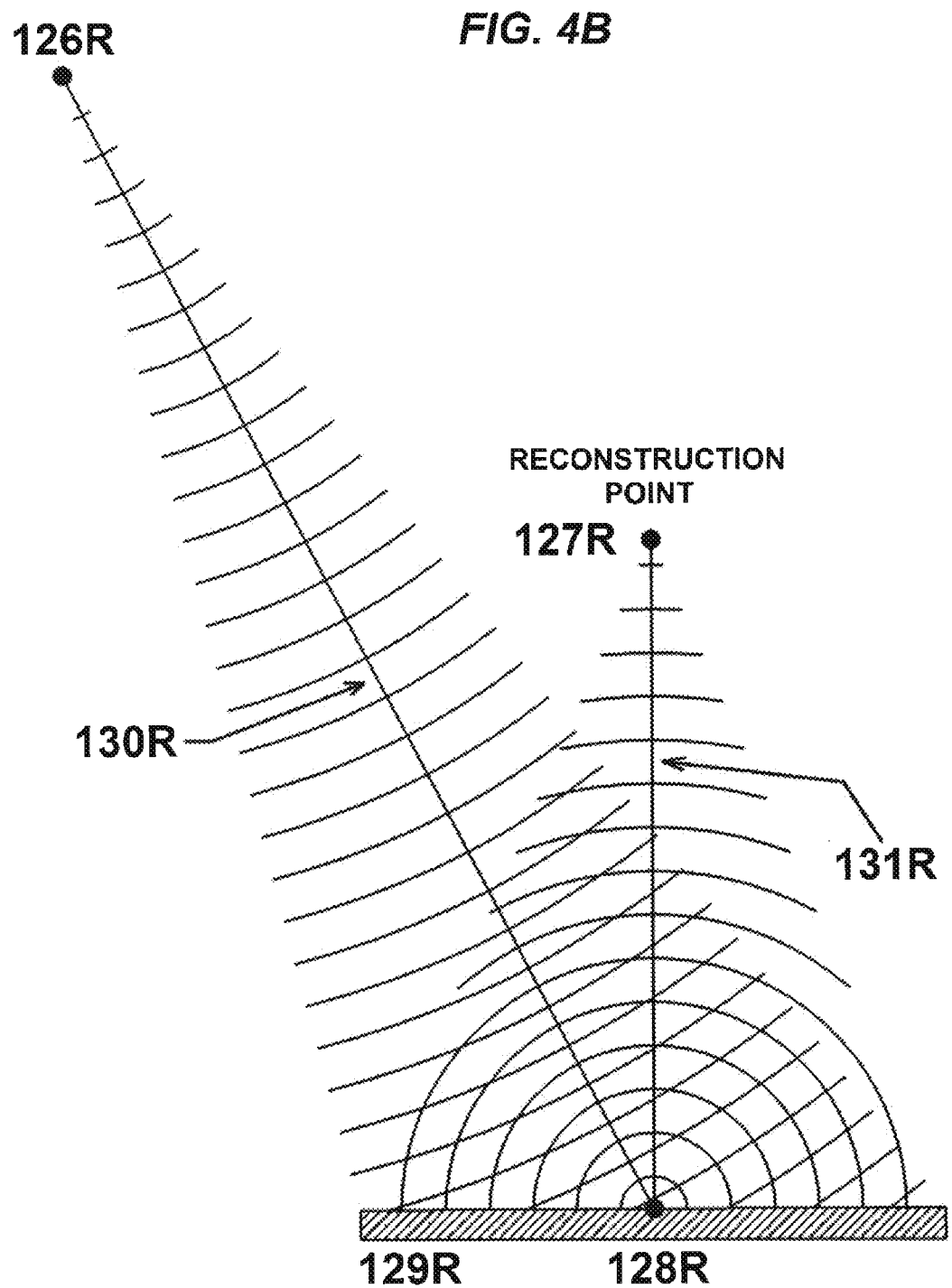

```
AMP. SAMPLE = PTT_ARRAY(A);
WHERE:
A = INT(B * C / D);
A = AMPLITUDE LOOK-UP INDEX;
B = TOTAL SAMPLES IN ARRAY;
C = PHASE COMPONENT;
D = CARRIER WAVELENGTH
```

MAKING HOLOGRAPHIC DATA OF COMPLEX WAVEFORMS

CROSS REFERENCE

This application claims priority from U.S. Provisional Application 61/741,160 filed Jul. 13, 2012 and is fully incorporated herein in its entirety for all purposes. Additionally, this application is a continuation-in-part of U.S. application Ser. No. 13/987,337 filed on Jul. 13, 2013, which claims priority to U.S. Provisional Application 61/741,160 filed Jul. 13, 2012, the disclosures of which are incorporated as if fully set forth herein.

FEDERAL RESEARCH

Not Applicable

BRIEF DESCRIPTION OF THE INVENTION

A novel method of Fast Fourier Transform (FFT) Analysis which collects waveforms and other vibrational intelligence and modulates or embeds same into one or more coherent reference beams of an n-dimensional holographic recording device which produces one or more holograms of objects, including singularity points in space. The result to provides wholesale differentiation of waveforms distinguishable from others based on their spectral characteristics. When said holograms are presented with reference beams of vibrational waveforms having similar characteristics to those which were present during recording of the original objects, phantoms of the original objects or subjects will reconstruct themselves in space with an energy glow of intensity that varies thusly with the degree of similarity between the waveform modulations of the reconstructing wavefronts and those of that same which were used to originally record said objects. Said n-dimensional description space can be sampled of the said glowing phantoms. Based on subsequent skilled analysis of these phantoms, their glowing strengths, positions, structure, layout, groupings and other dynamics about them—which take on a plethora of useful analysis methods of them within the scope of the invention—pattern recognitions and other information can be achieved about the subjects, subject matters and state of the sensory environment being analyzed.

In the prior art there is no known effective technique which provides a wholesale differentiation or recognition of a waveform pattern. By wholesale recognition we mean the elimination of the traditionally convoluted middleware techniques traditionally associated with waveform recognition, one example being traditional spectral analysis techniques as combined with subsequent arcane and sometimes convoluted algorithms and filtering processes.

We have devised the method herein which solves most of the difficulties experienced in the pattern recognition sciences in a novel, speedy and what we feel is a much more elegant manner than the prior art. It involves making holograms of complex waveforms, a technique we call the 'HOW' method (Hologram of Waveform). Whereas conventional physical or digital holography makes holograms of physically or virtually solid objects, respectively, our technique freezes a time-based fluctuating state of pure energy—a waveform in and of itself. We have achieved this by inverting certain principles involved in conventional holography. We call this holographic method time-icing a waveform. For many applications it is more efficient by orders of magnitude than the traditional Cooley-Tukey algorithm of Fast Fourier Analysis since it permits wholesale differentiation of a waveform as compared with others, as well as the differentiation of spectral components, individually, or combinatorically, en masse.

Many applications of the device are envisioned, most notably in the automated recognition of objects, patterns and other various subject matter within visual images, audio streams and other sensory data. Among these include applications in gesture recognition.

Both hardware and software embodiments are envisioned in this invention. It will be understood that various details of the subject matter described herein may be changed without departing from the scope of the subject matter described herein. Furthermore, the foregoing description is for the purpose of illustration only, and not for the purpose of limitation.

BACKGROUND OF THE INVENTION

There is a branch of holography known as recognition holography to those skilled in the art. Recognition holography is a technique where physical objects are holographically recorded as a reference archetype for subsequent comparisons to secondary objects having varying degrees of similarity with the original. Here, the hologram ultimately serves as a discriminator—a recognizer—that helps detect this degree of similarity. The process requires that the secondary objects to be compared with the primary original are placed in proximate physical position where the original object existed with respect to the holographic recording medium at the time of recording. The comparison object is then illuminated with the same reference beam or one with nearly identical properties such as wavelength and physical positioning as the original one. These rays interact with the secondary object and subsequently interact also with the hologram. If the secondary object is similar to primary, it's complex wavefront will also be similar and the hologram will filter these rays accordingly in proportion to that degree of similarity. A lens is sometimes also used to concentrate the diffracted rays filtered by the hologram into a focal point where they may be practically measured by a transducer such as a photosensor. The lens can also be included in the original recording setup which can eliminate the need to include one later as the hologram reproduces the effects of the original wavefront which included the lens. The photosensor can be connected to additional circuitry which monitors the recognition process electronically and/or automatically.

To our knowledge there is no known precedent in the field of holography for objectively recording a purely time-domain based entity such as a complex waveform which is an ephemeral, dynamic fluctuating state of energy somewhat different than a more physical embodiment of energy matter waves collectively amounting to physically solid objects. The latter of which may be bombarded by coherent beams during the recording process, but the former is difficult and/or impossible to conceive of or achieve using conventional holographic techniques. Moreover, our invention allows multiple recordings of numerous primary waveforms on a single hologram. As in conventional recognition holography, our process concentrates rays to one or more precise locations in space where a photosensor or similar measurement apparatus, or alternatively a mathematical virtual sampling of the locations, can occur to detect similarity to secondary waveforms which are to be compared.

The general field of Holography dates to 1947 when British physicist Dr. Dennis Gabor first coined the term "hologram," which literally translated means the whole picture. The core concept and phenomenon behind a hologram's namesake is due to it's unique property whereby the entire whole of an object's visual presence image is captured in every single recording pixel of the hologram, itself, sometimes referred to as an interference pattern or holographic recording. Though it requires a certain number of such pixels to be able to reconstruct a holistic image of the object to a suitable level of clarity, the scientifically fascinating point of this holistic property is that a hologram can be greatly damaged or destroyed, and yet the entire image will reconstruct in real and virtual space when re-illuminated by the proper radiation source. When we say the "illuminated" we do not merely refer to visible light as the radiation source, as a hologram can be constructed using any type of electromagnetic or other physical vibrations, including sound waves. However, the essential requirement for recording a hologram is that the source of radiation which is used be coherent; that is, it contains rays which are synchronized phase-wise in lock step fashion to each other.

While there are slight variations in holographic recording techniques using coherent radiation sources other than visible light or ultra-violet or infra-red lasers, the conventional recording process for making a hologram is generally carried out in most cases as follows:

The source rays are split into two beams usually by means of a beam splitter and subsequently are expanded by lenses, generally. One of these beams—the object beam—is the portion of the source which bombards the object. These bombarding rays interact with the object such that they are either reflected or transmitted by it toward a recording medium which captures them—usually a high resolution plate or film. Simultaneously, the second beam—the reference beam—is directed in an unadulterated fashion toward the recording medium itself. These two beams, also known as wavefronts, interact with each other so as to generate microscopic interference fringes upon the surface or within the entire volume of the recording medium material. These fringes are sometimes referred to by those skilled in the art as Fraunhoffer lines, Newton's Rings and Moire patterns amongst others. In laymen's terms they appear as complex patterns which look like "ripples on a pond." More accurately they are complex superpositions of Fresnel patterns, and take on the similar pattern of the classic Fresnel lenses seen in the towers classic lighthouses towers of yesteryear. Although the principle of bending rays by the underlying mathematics of the hologram and the Fresnel lens is basically the same concept in both cases, the hologram performs the bending by means of diffraction and the lighthouse does it by means of refraction. When the recording material is processed it is re-illuminated with the reference beam, the fringe patterns interact with the radiation so as to reconstitute the complex wavefront that existed at the time of the recording.

Thus, even though the original object has been removed—usually—from the recording environment, it's virtual presence is reconstructed back into physical space where it may be viewed.

The experience of viewing a true hologram generated by this process is not fairly comparable to the highly limited experience associated with traditional stereographic processes—also known as "3D" and sometimes hyped and misnomered to be holograms; rather it is more akin to looking through a window into a world where the object seems to be actually there. That the object is actually there is also not very far from the truth for the very reason that a genuine hologram focuses rays to generate a real image in actual space as well as a virtual image.

Since 1967, experiments in computer generated holography, also known as digital holography have been carried out. The technique involves making holograms by pure mathematical calculation using computers rather than by the interaction of physical rays. These artificially generated holograms are subsequently printed or reduced photographically onto high resolution film, plates or other recording material so that they can be viewed and experienced like conventional holograms made by more physical recording apparatus.

Both conventional holography and CGH or digital holography normally rely on the use of virtual coherent beams of monochromatic radiation. Occasionally, full color holograms are made where Red, Green and Blue lasers are used either sequentially or simultaneously.

The automation and robotics industries, which are practical applied branches of the scientific artificial intelligence (A.I.) community, altogether suffer from a deplorable lack of versatility when it comes to the growing needs of industry to be able to faithfully recognize complex, sensory based information, which include audio and visual based patterns amongst others. Moreover, in situations where said complex patterns need to be analyzed quickly and reliably 'on the fly,' the state of the art research and design process has historically been one which hypes functional expectations of versatility at the outset, and yet because of the unrealized complexity involved in combining the typically requisite smorgasbord of convoluted approaches involved, finally reduces itself towards the development of systems which, to the contrary, eliminate the range of complexity and sophistication of patterns to be recognized from the application. The modern trend is the reductionist approach: to pick the most simple and reliable way to get the job done even if this involves convoluted shortcuts that lack for versatility.

Within this negative trend of shortcut-type approaches the marketplace has introduces a recent plethora of devices each of which is dependent upon bombarding a person with infrared radiation—shining it directly into their eyes no less. Patterns in the illumination are photographed and subsequently analyzed—to produce three dimensional information about the subject or subjects. Other companies also are currently producing shortcut-approach devices similar to Kinect, aimed at gesture recognition using similar ray-projection technology. Such systems are altogether doomed to fail absolutely in anything but clean and tight living room or laboratory-style environments. Moreover, such devices do not work in direct sunlight.

Some shortcut approaches in this field also take into reductionist or isolationist account the oversimplified concept of a foreground and a background. To those skilled in this art, the terms foreground and background are objectively non-entangled elements that can ultimately be separated perfectly into entities distinct from one other. The reality is that the two concepts are completely subjective and narrowing to true progress in the field. It should be a foregone conclusion that foregrounds and backgrounds are not objectively capturable within the small components—the pixels—but are purely subjective and relativistic terms. Many have tried to differentiate foregrounds from backgrounds. In the prior art, such uses of differentiation yield limited results based only on a narrowly applied what-you-see-is-what-you-get type pixel-for-pixel basis. Such instances include inventions involving traveling matte photography, and also the differential analysis of audio or video by comparing pixels or sound bits acquired most artificially and superficially as two separate instances of acquisition to provide the separation: first an element combined with a background, and secondly the actual background itself.

Rather, the general modern understanding of the underlying processes of biological visual and hearing systems would have it that foregrounds, backgrounds and all other objects of distinguishment are elements purely subjective/subjectively important to the observer.

While in recent years it has become more understood to the more disciplined of the scientific minds within this particular community of discourse that to get to the level of reality that enables a system to be able to distinguish real world higher dimensional objects from one another given mere one-dimensional sound bits or two-dimensional arrays of pixels—to perform the process by artificial computational means—one must have some type of better effective model that actually mimics a biological brain and creates the internal reality of it. However, to date no one has provided an adequate model that explains the complex functions of the central and peripheral nervous systems with any absolutely reliable degree of accuracy or confidence in generating an artificial analog to these that actually works with any high order degree of real-world complexity beyond the laboratory style environments. There have been isolated theories by biologists and physicists that the human mind operates in some manner like a hologram, or is holographic per se. There are also isolated theories by metaphysicists which run effectively parallel to this thinking that the biological brain somehow works using vibrational interpretation. Nevertheless, the suitable analog or analogs for practical artificially applied usage have proven to be highly elusive.

The within novel invention is a useful model for a wide range of recognition applications within real world or virtual world environments and scenarios. It usefully combines the two isolated theories of vibrational interpretation and a holographic mind or holographic universe in a practical device and methodology.

BRIEF DESCRIPTION OF THE DRAWINGS

FIG. 2B is a side view projection of FIG. 2A and where the entire coherent wavefront is seen. All the R numbers correspond in like kind with the L numbers of FIG. 2A, i.e., with the exception of 117 which is automatically implied.

FIG. 3A, however, is a representation of the prior art. We see clearly by 122L, 123L and 124 and 125 that the coherent beam is an unmodulated sine wave. 118L represents the point source in space; 121, is the holographic recording; 120L is a recording pixel; and 119L is the object point.

FIG. 3B is that it represents the prior art. We see clearly by 130LL, 131L and 132 and 133 that the coherent beam is an unmodulated sine wave. 126L represents the point source in space; 129LL is the holographic recording; 128L is a recording pixel; and 127L is the solution or reconstruction point.

FIG. 4B is a side view projection of FIG. 4A and where the entire coherent wavefront is seen. All the R numbers correspond in like kind with the L numbers of FIG. 4A, i.e., with the exception of 132 and 133 which are automatically implied.

FIG. 5 corresponds to the recording in FIGS. 1A, 1B, 2A and 2B.

FIG. 6 corresponds to the recording in FIGS. 3A, 3B, 4A and 4B.

FIG. 7 shows what the holographic recording of FIG. 5 would look like if expanded into a larger, somewhat rectangular, recording plate. 139 shows the actual recording that is made using the coherent beam embedded or modulated by the complex waveform. 134, 135, 136, 137, 138 show holographic recordings made separately by each of the individual spectral harmonic components 140, 141, 142, 143 and 144 respectively. Most interesting is that if 139 is closely examined, it is seen that all the spectral components of 134-140, 135-141, 136-142, 137-143 and 138-144 are contained within it! 145, of course, is the complex waveform that yields 139 when embedded into or modulated with fundamental 144.

FIG. 9 shows the same holographic recording of FIG. 5, expanded. 147 is the recording as generated by a superposition of all the individual recordings made by the fundamental and harmonics shown in 146. 149 is the recording made by merely the complex waveform 148 which is embedded into or modulated with the fundamental. When 147 and 149 are compared, we see that there is no difference! In other words, all the spectral harmonics are present, and all of these frequencies contribute to the phantom glow of the recognition or solution point, which is the original object point reconstructed.

DETAILED DESCRIPTION OF THE INVENTION

Figure 1A:
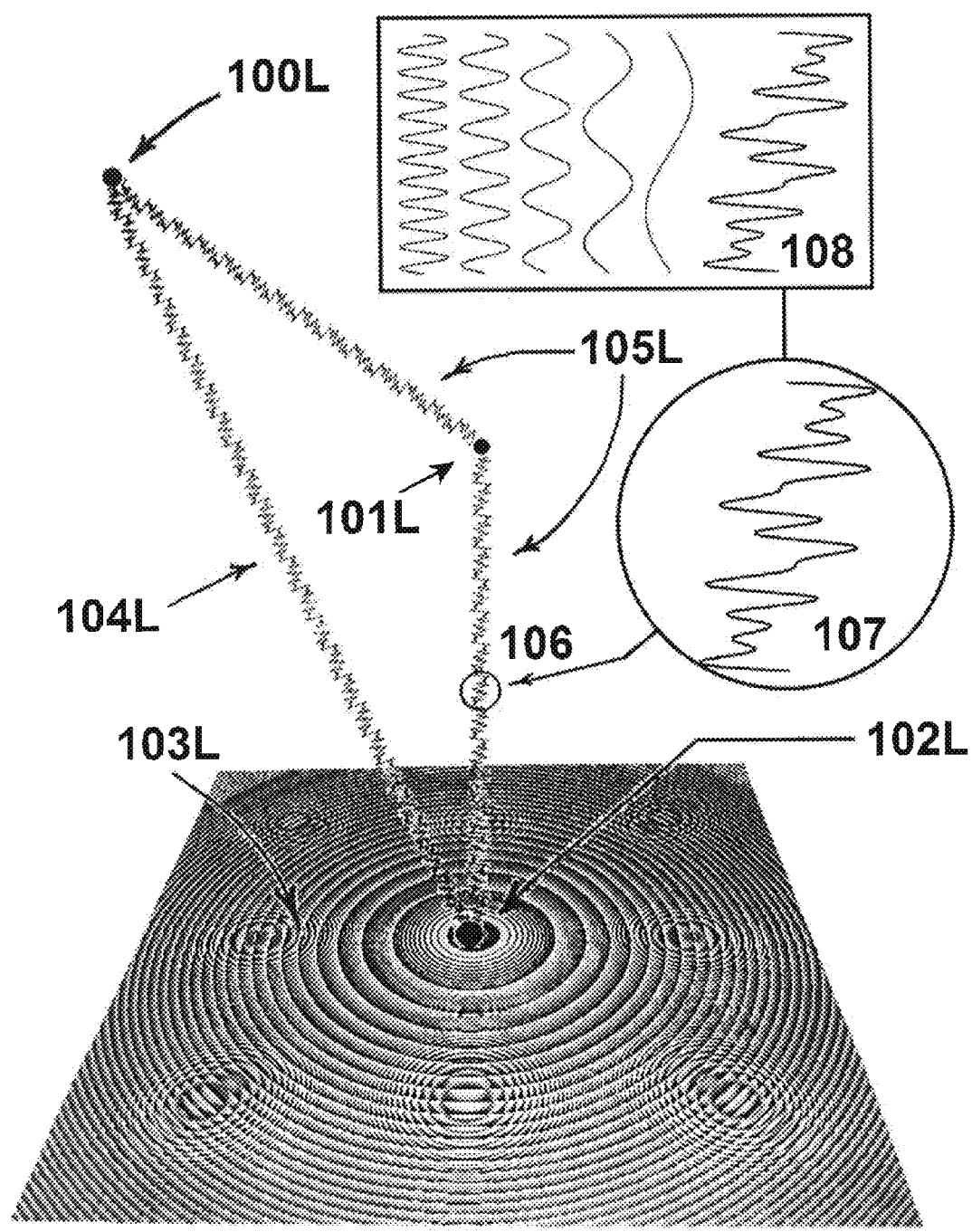
FIG. 1A demonstrates the holographic RECORDING process of the invention. 100L shows a point source of emission of a coherent reference beam ray. It is seen that the fundamental wavelength of this coherent beam is modulated by or embedded with a complex waveform and this fact amplified by 106, 107 and 108. 108 also shows that the complex waveform is comprised of harmonics which give rise to the complex waveform's overall characteristics. This reference beam ray 104L strikes a holographic recording 103L which in the drawing is a plate, at point location 102L. 101L represents an object point in space. 105L demonstrates the reference beam being broken into an object beam. It is given to understand by implication of the drawing that the ray is repeated for all recording points or pixels of the hologram.
Figure 1B:
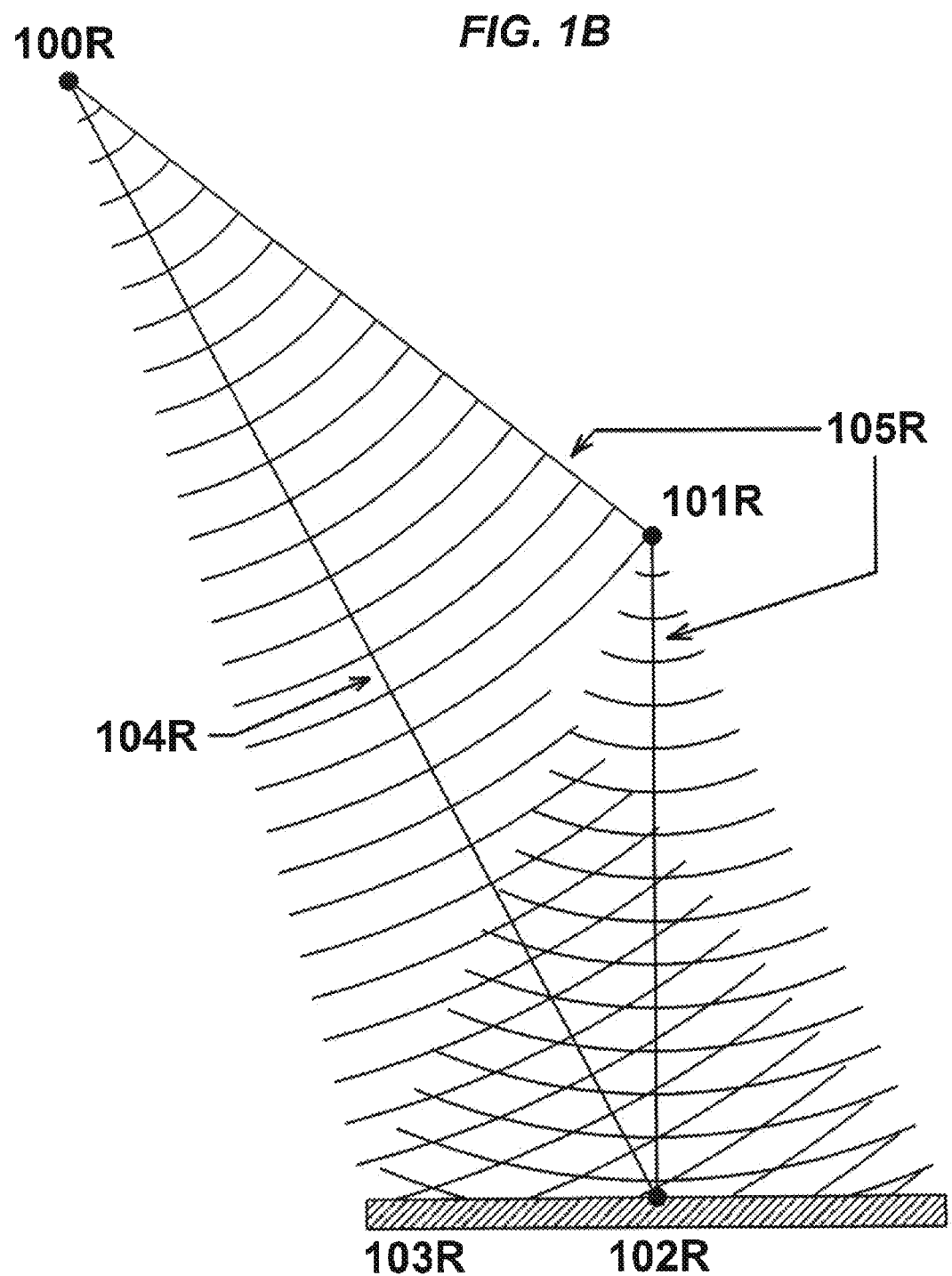
FIG. 1B is a side view projection of FIG. 1A and where the entire coherent wavefront is seen. All the R numbers correspond in like kind with the L numbers of FIG. 1A, i.e., with the exception of 106, 107 and 108 which are automatically implied.
Figure 2A:
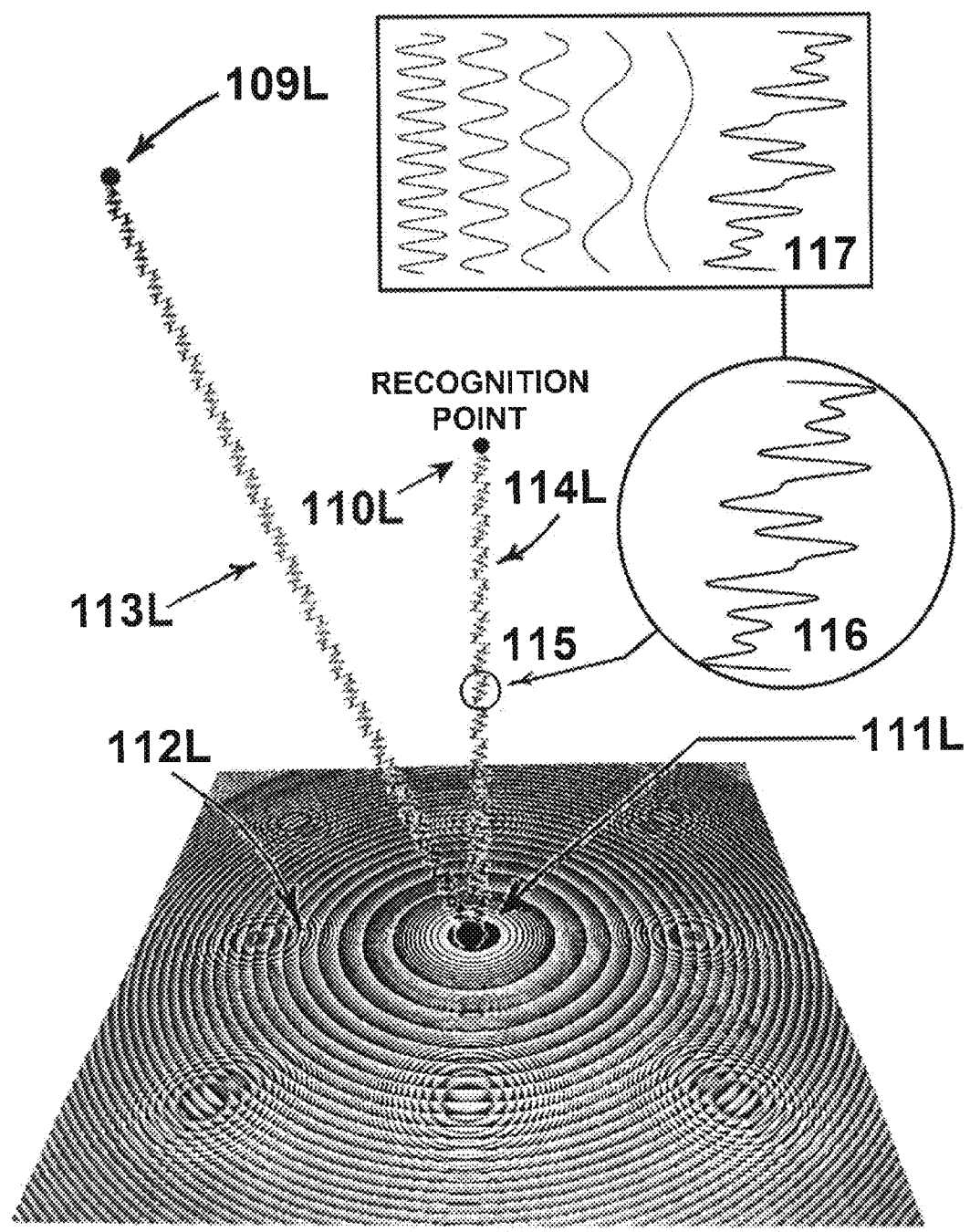
FIG. 2A demonstrates the holographic RECONSTRUCTION process of the invention. The drawing corresponds very much to FIG. 1A with one primary exception: the "Recognition Point" 110L is the solution, the original object point reconstructed in space in contrast to FIG. 1A where it was initially recorded. As in FIG. 1A, the same reference beam—modulated or embedded with a complex waveform—is used to perform the reconstruction same as it was used to perform the recording. 109L is the point source; 113L is the reference beam wavefront; 112L is the holographic recording; 111L is a holographic recording pixel being bombarded for reconstruction in this case; 114L is the reconstructing wavefront after the reference beam is modified by the hologram; and 115, 116 and 117 show the detail of the complex waveform which is embedded into or modifying the coherent beam.
Figure 3A:
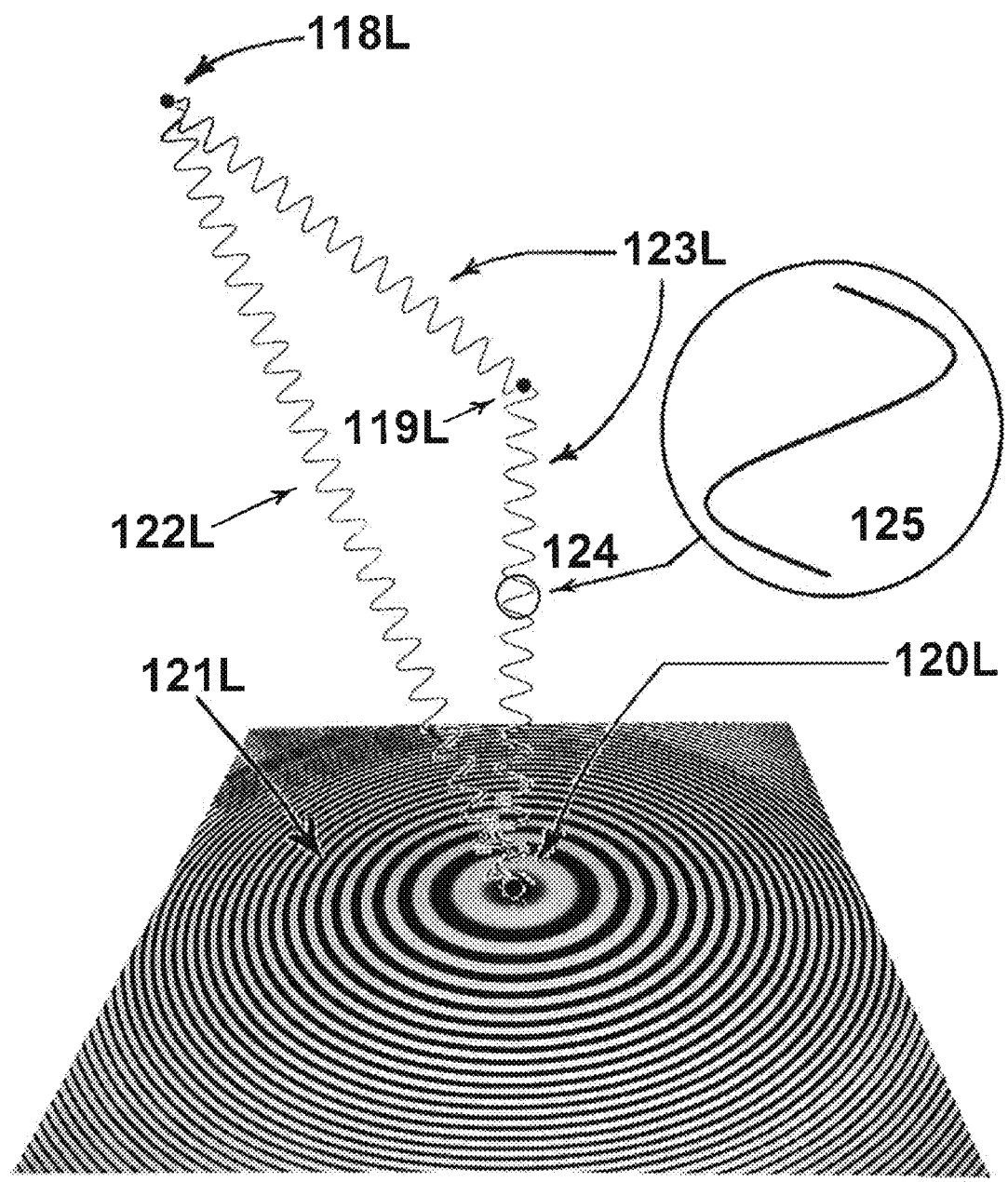
FIG. 3A is the same holographic recording setup as given by FIG. 1A.
Figure 3B:
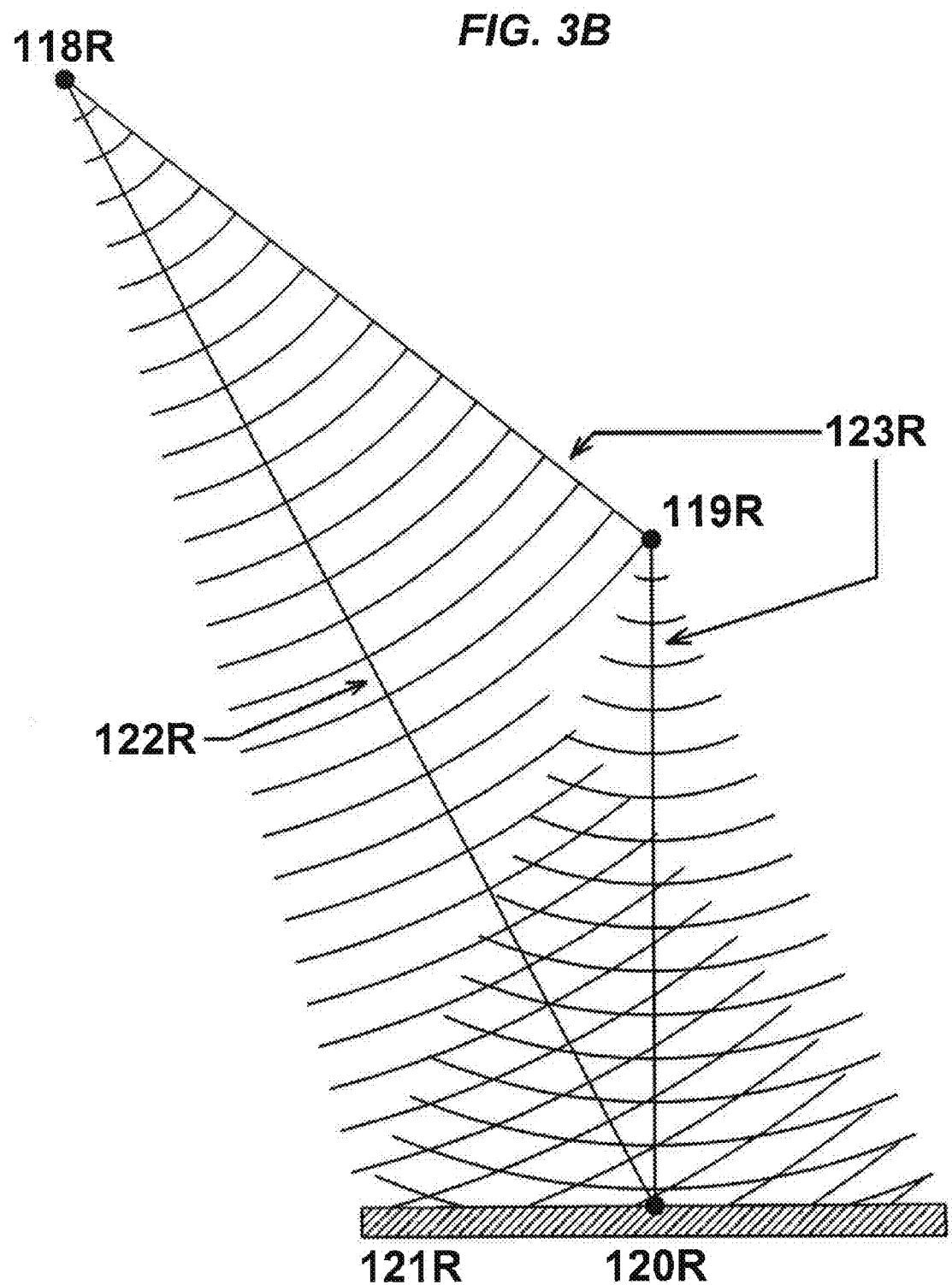
FIG. 3B is a side view projection of FIG. 3A and where the entire coherent wavefront is seen. All the R numbers correspond in like kind with the L numbers of FIG. 3A, i.e., with the exception of 124 and 125 which are automatically implied.
Figure 4A:
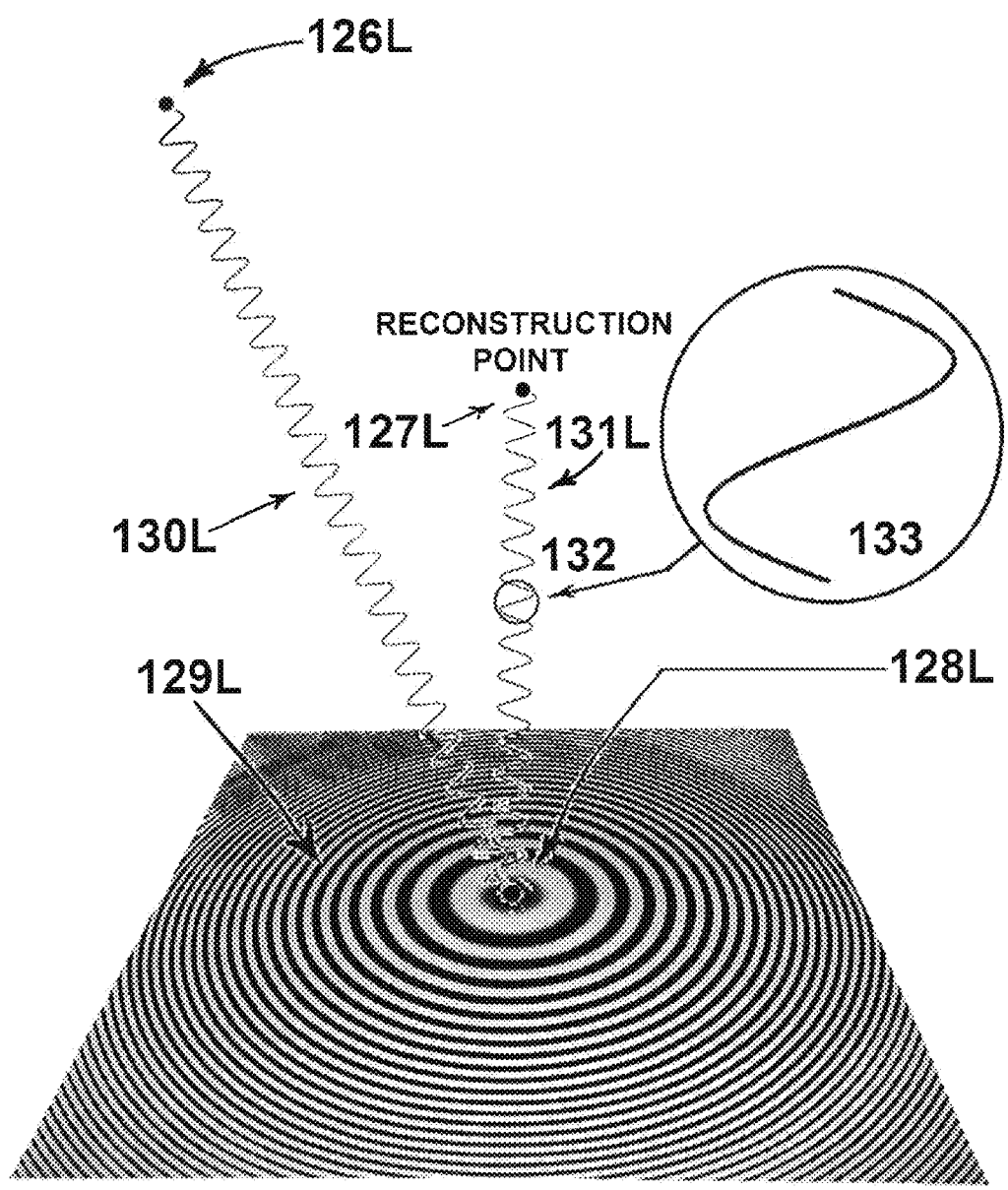
FIG. 4A is the same holographic reconstruction setup as given by FIG. 2A. The exception as in FIG. 3A
Figure 5:
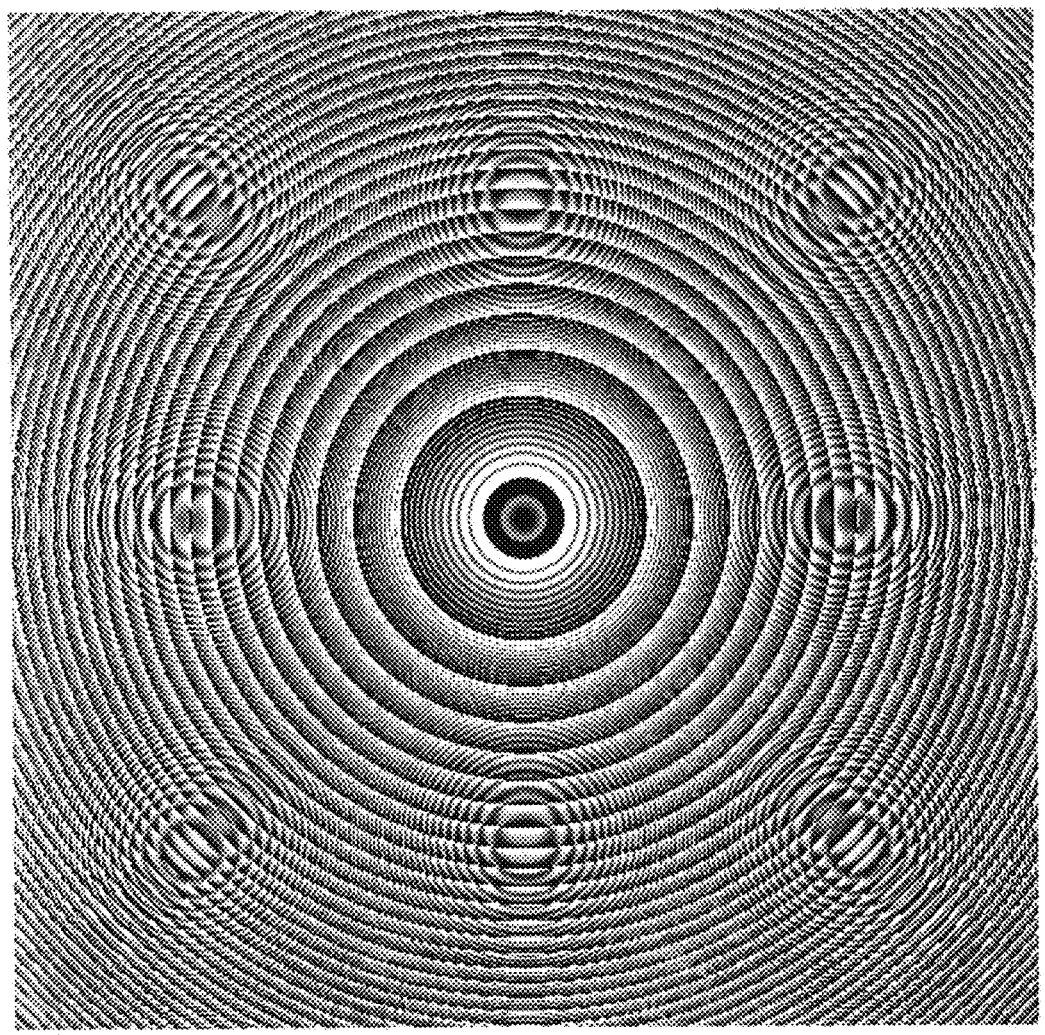
FIG. 5 shows a holographic recording as made by the invention. Be it noted that the recording shown is a plate, i.e., planar form of recording. However, there is no limit as to what manner or shape the recording pixels may take in terms of area or volume. Indeed, point clouds may be used.
Figure 6:
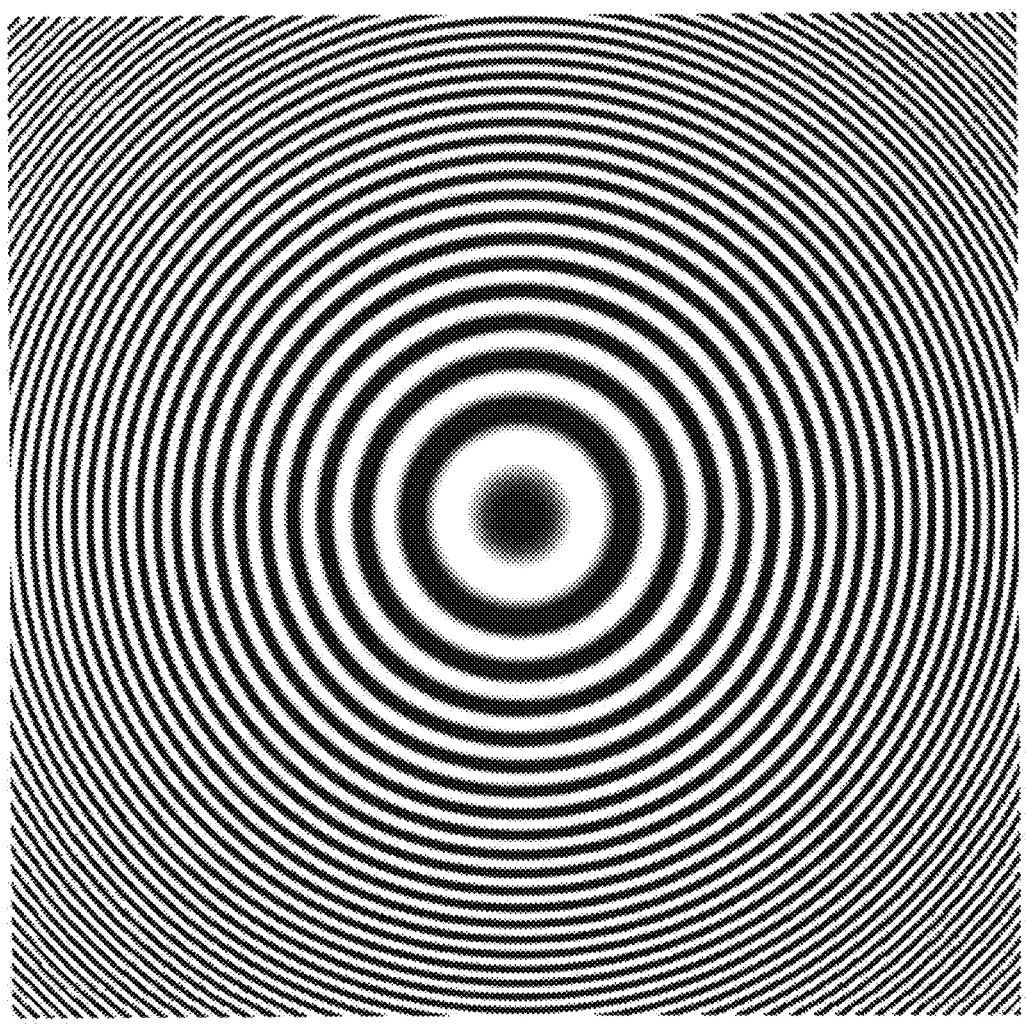
FIG. 6 shows a holographic recording as made by the prior art.
Figure 7:
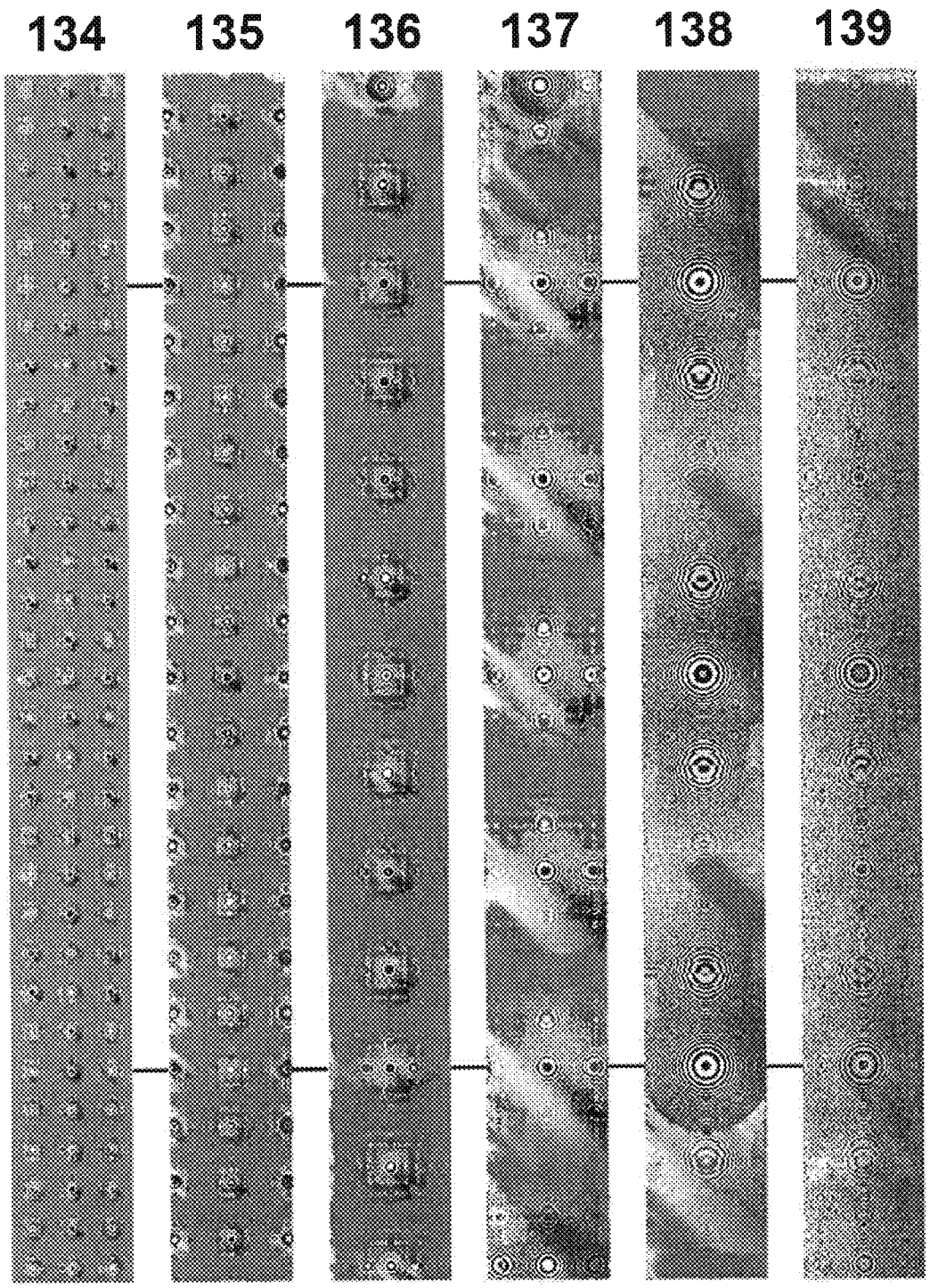
FIG. 7 and FIG. 8 correspond to each other.
Figure 8:
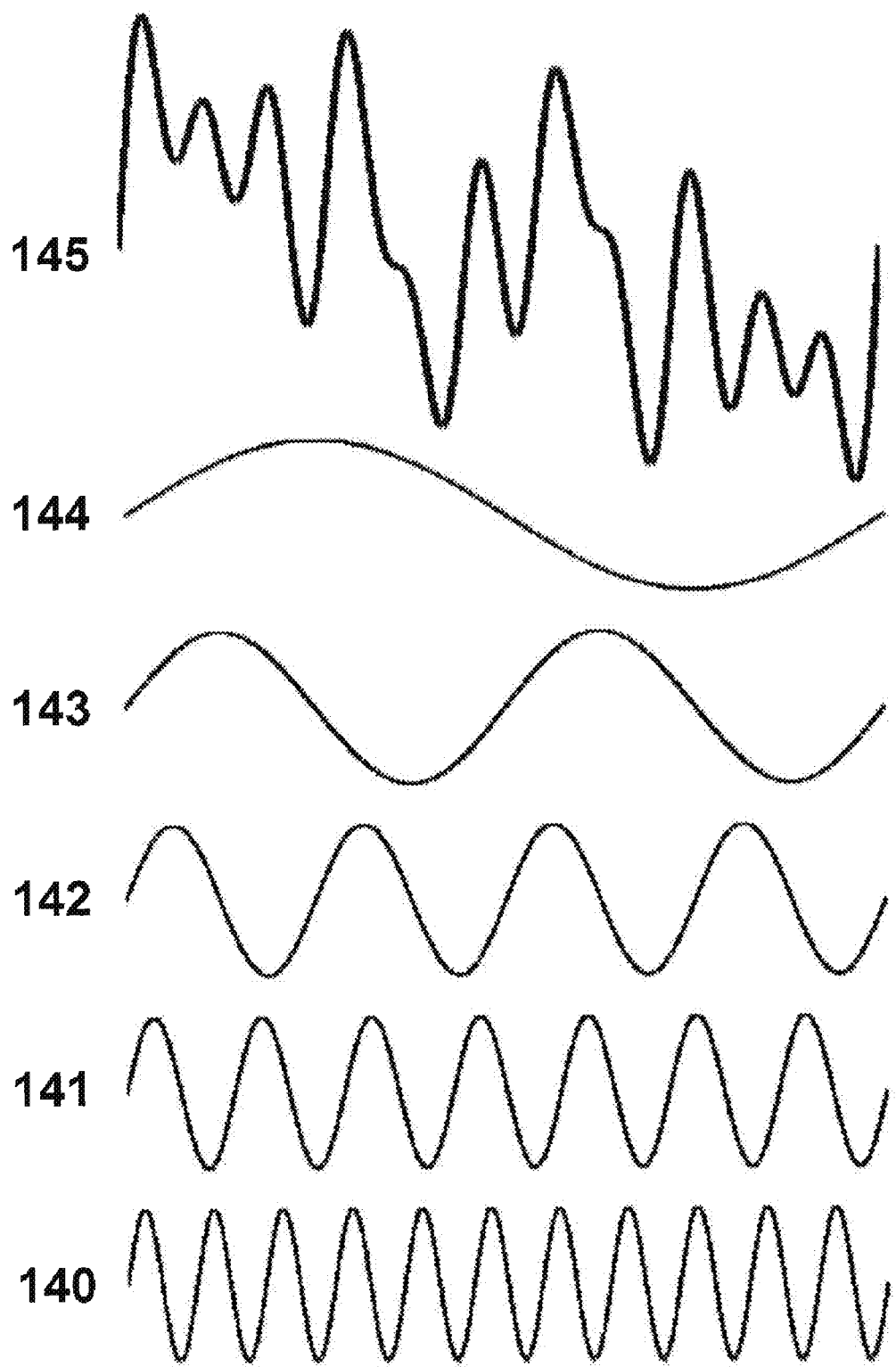
Figure 9:
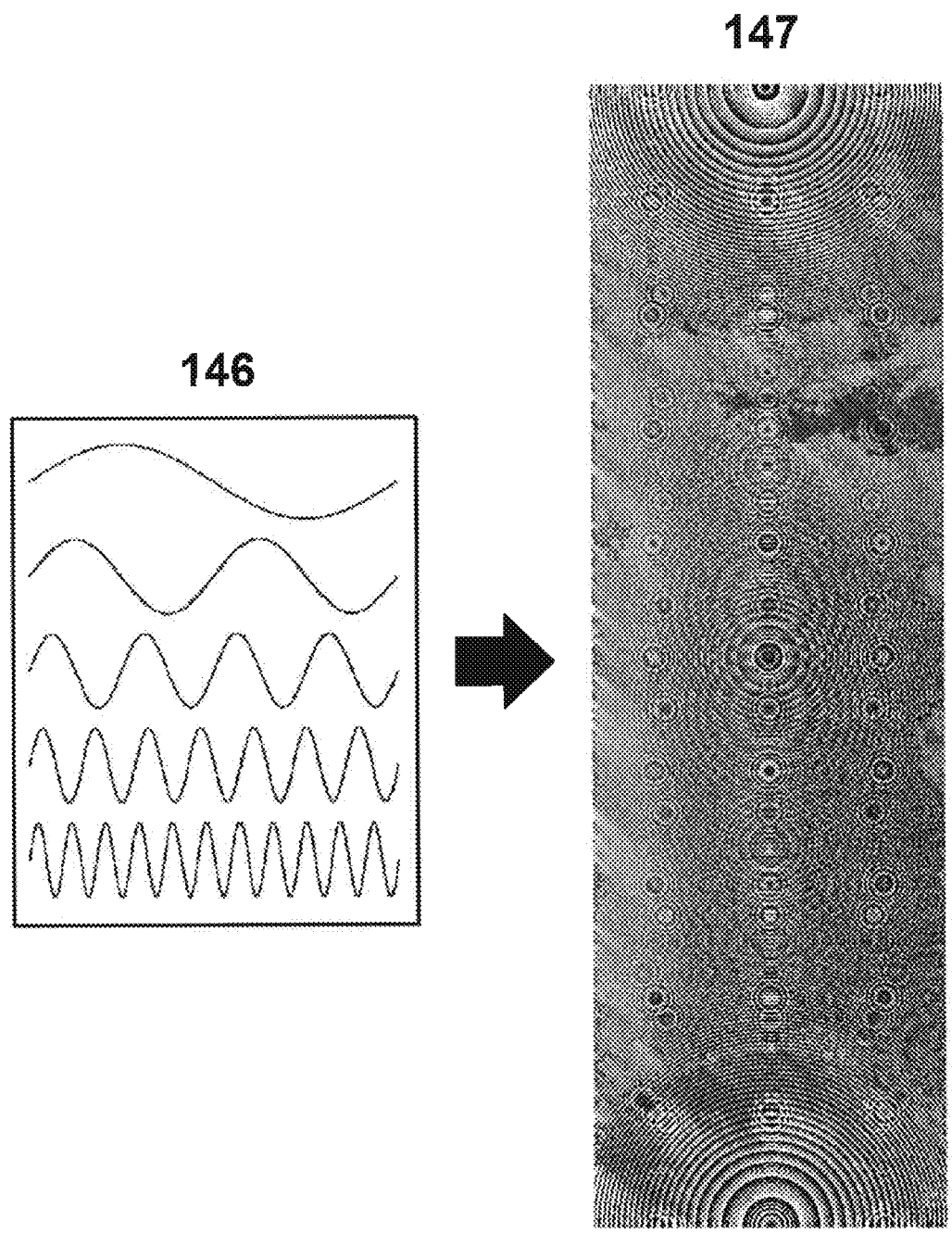
FIG. 9 and FIG. 10 are particularly fascinating.
Figure 10:
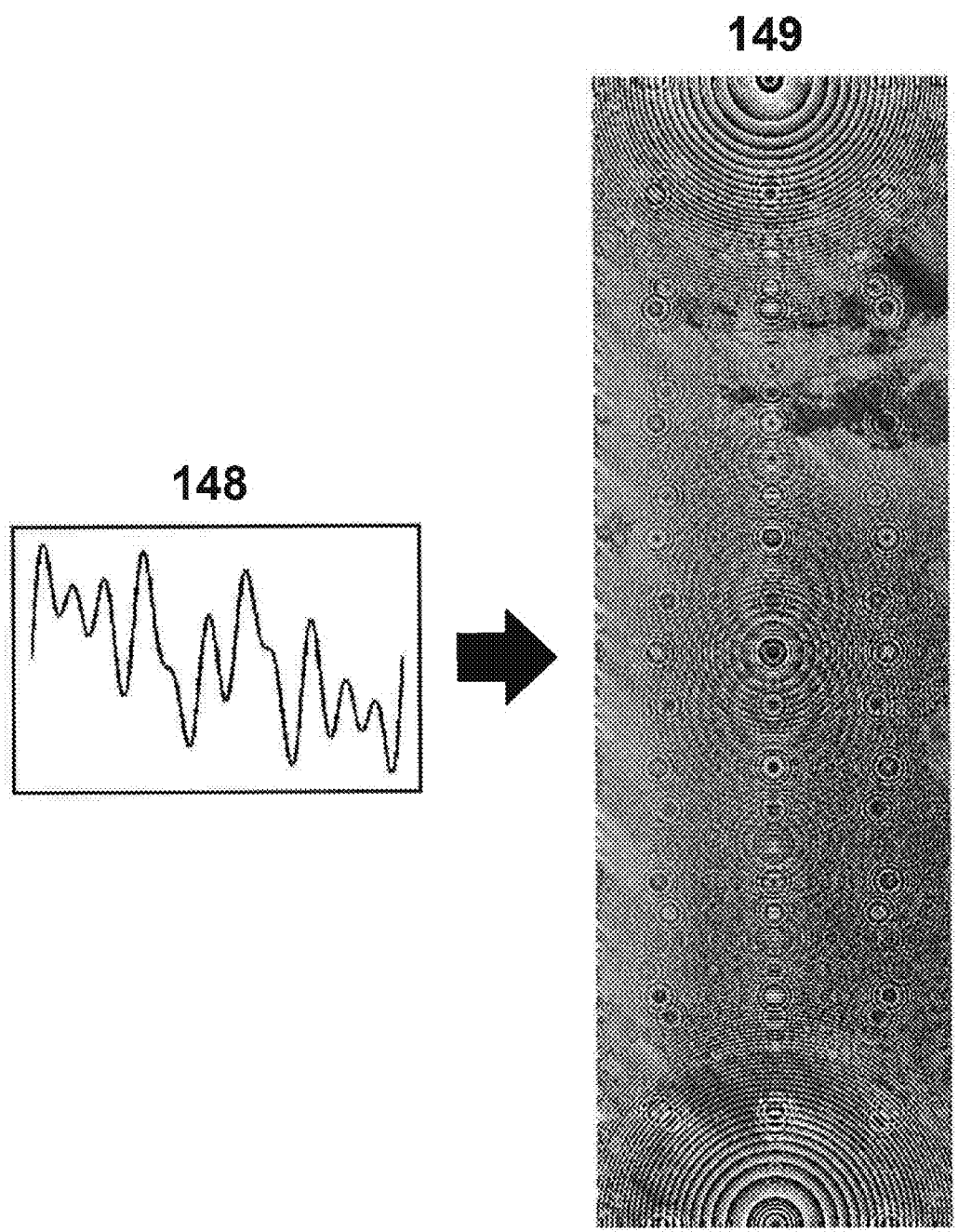
Figure 11:
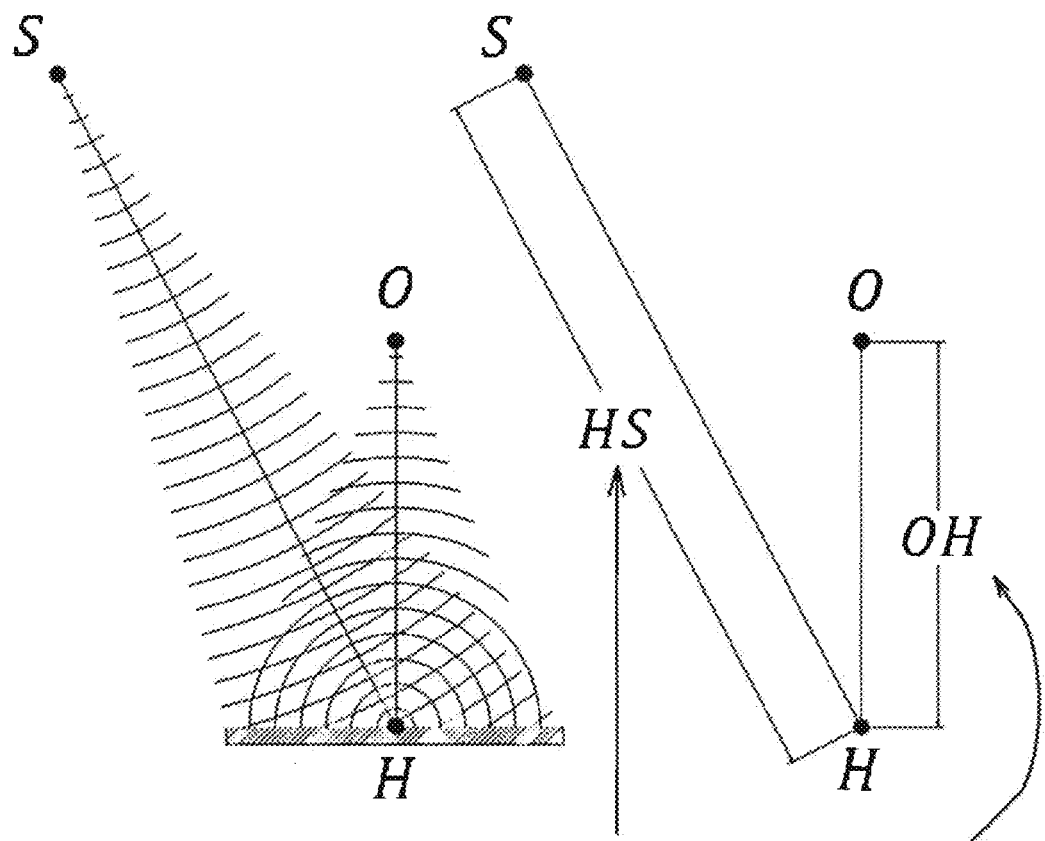
FIG. 11 shows two diagrams of the RECORDING process which are similar to FIGS. 1B and 3B. Here we see the recording beam for a specific ray and the formulae used to calculate the ray, which is similar to a ray trace but in the invention we call phase tracing. The Pythagorean Theorem is used for X, Y and Z components, although holograms of even higher dimensions can be used by the invention. Subsequently, the two Phase Components are calculated. In the recording process only two rays and Phase Components need to be calculated.
Figure 12:
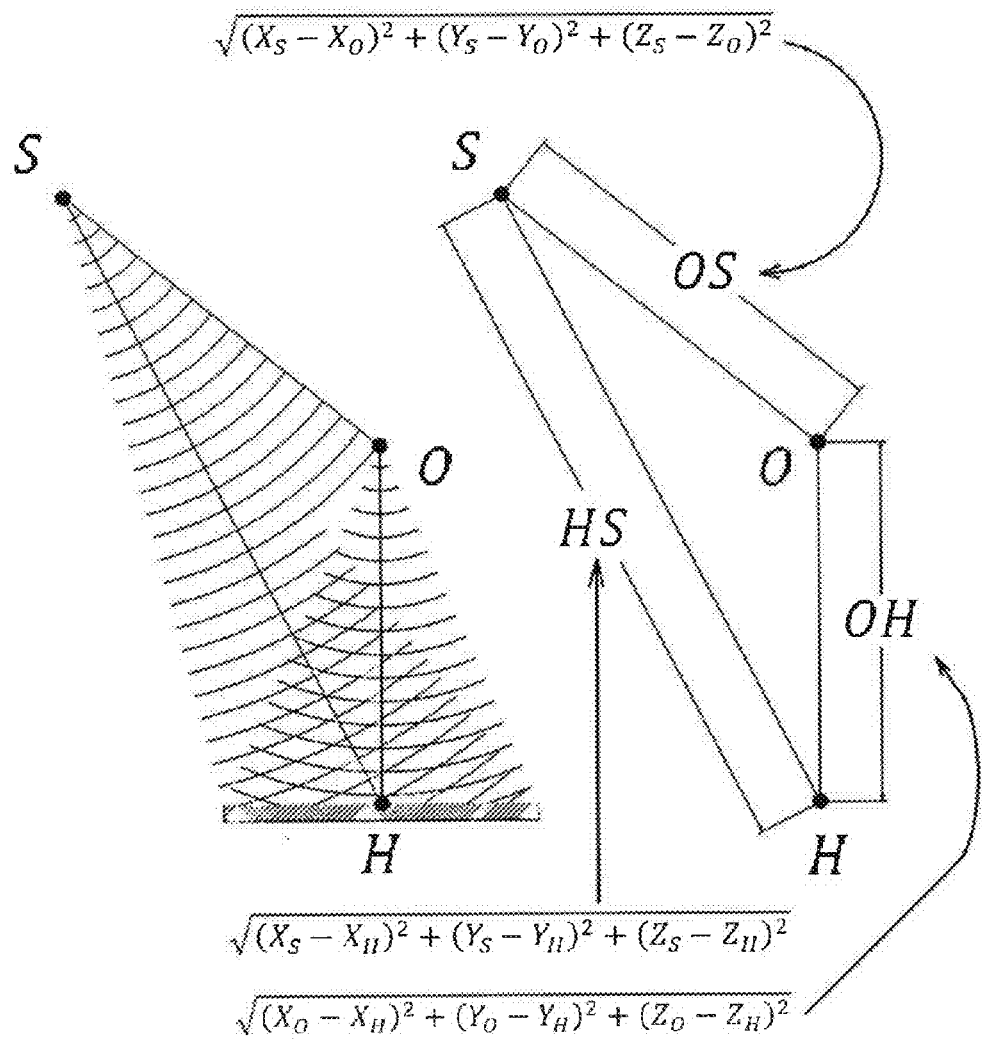
FIG. 12 shows two diagrams of the RECONSTRUCTION process which are similar to FIGS. 1B and 3B. Here we see the recording beam for a specific ray and the formulae used to calculate the ray, which is similar to a ray trace but in the invention we call phase tracing. Same as in recording, the Pythagorean Theorem is used for X, Y and Z components, although holograms of even higher dimensions can be used by the invention. Subsequently, the Phase Components are calculated. In the reconstruction process three rays and Phase Components need to be calculated.
Figure 13:
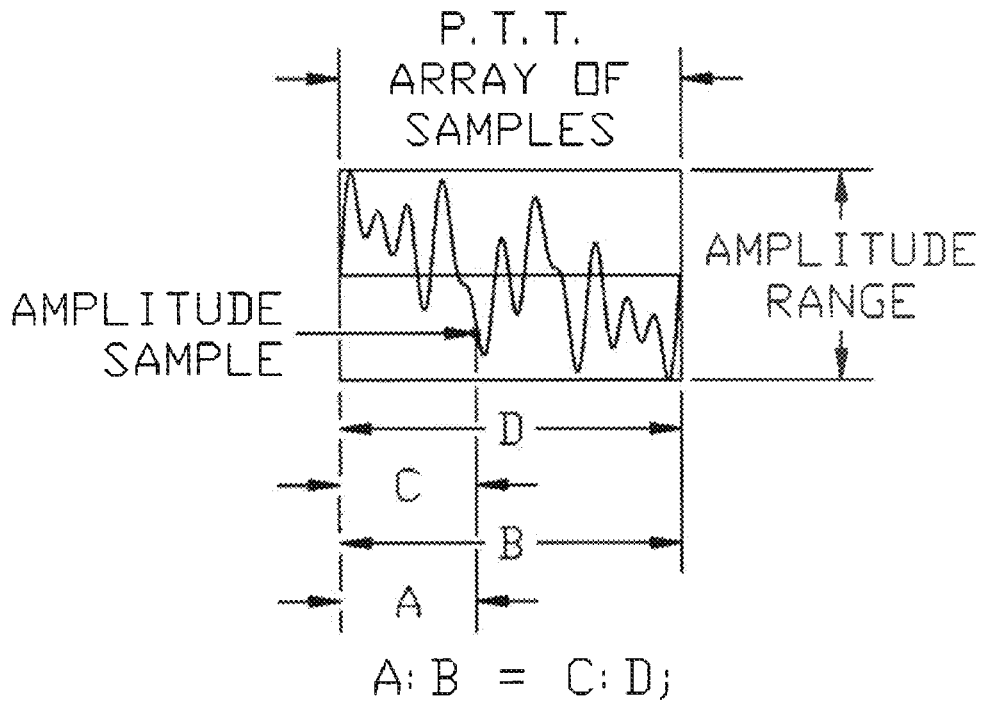
FIG. 13 shows the requisite process for modulating or embedding the complex waveform into the fundamental or carrier. In terms of mathematics it is essentially achieved by a ratio and proportion operation: A is to B as C is to D.
Figure 14:
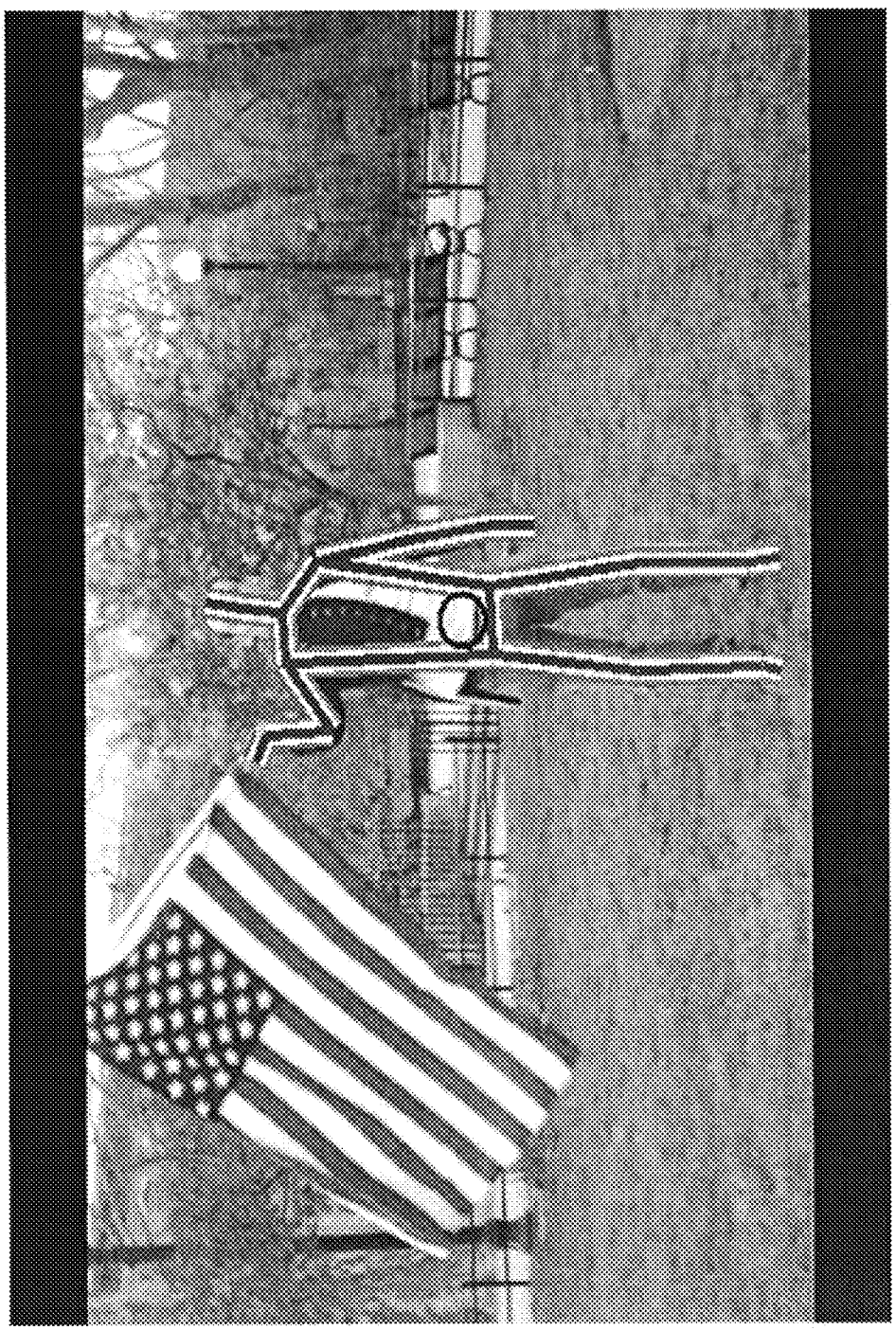
FIG. 14 shows a visual frame of a man—one of the inventors—carrying an American Flag as he wanders about a public park, patriotically dressed as George Washington. The Black Circle shown in the center of his person is a centroid achieved by an undisclosed derivative of the filtering process described in this invention whereby a waveform is captured by means of sensory intelligence. The Black Circle vibrates in two dimensions—X and Y. Therefore, the local vibration of this Black Circle at each frame of the video from which it was taken represents two samples of two waveforms: an X sample and a Y sample of an X waveform and a Y waveform. The auxiliary dots or recognition points of the man's arms, legs and head are translations from a trained database after the waveforms were: (1) collected from an initial vibrational filtering analysis of the video; (2) embedded into coherent reference beams which were used to reconstruct object points using pretrained holograms; and after the reconstructed object points were sampled and compared with the trained database.
Figure 15:
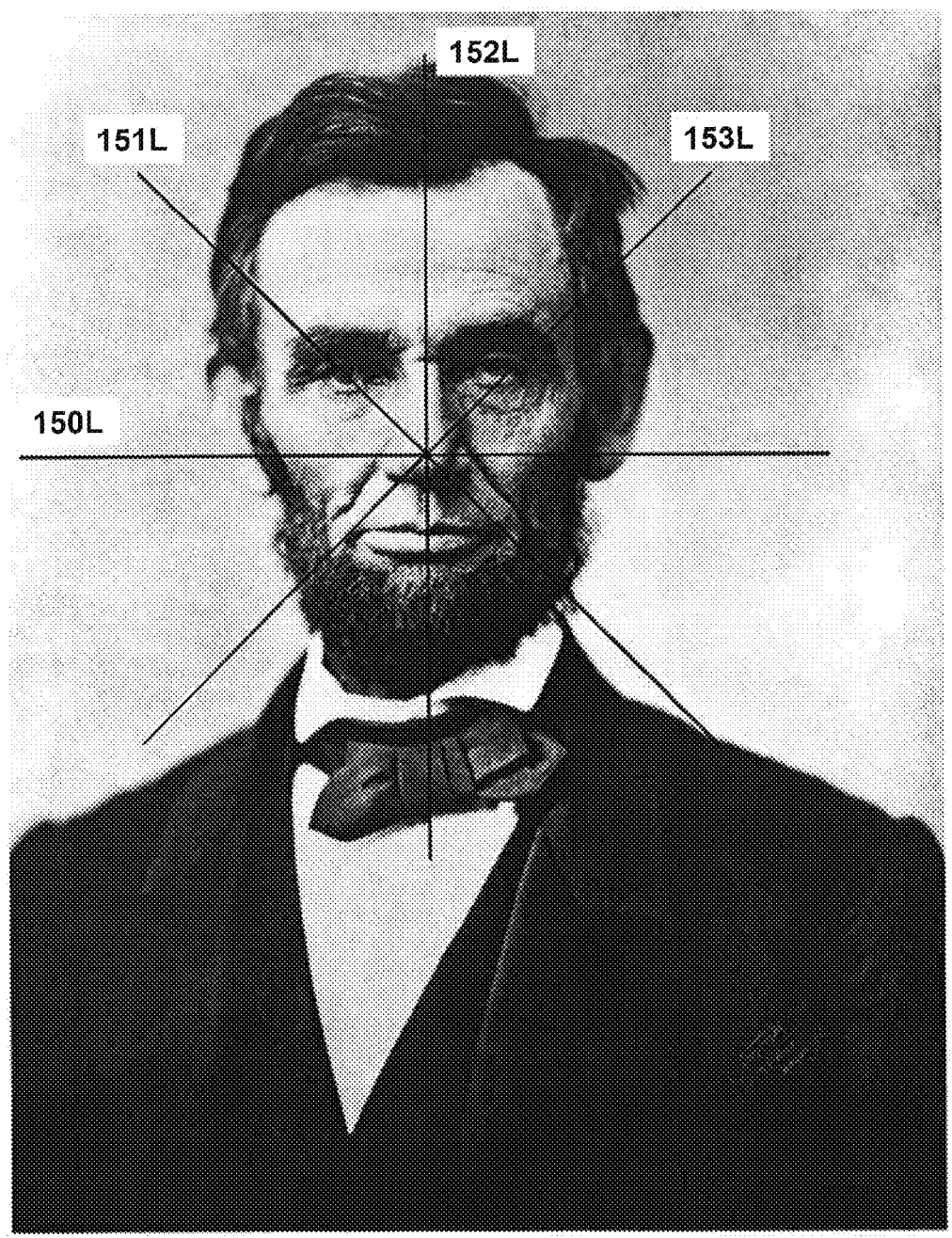
FIG. 15 shows a photograph of President Abraham Lincoln. The asterisk-like structure in the center of his face represents a scanning function of the invention whereby pixel slices at varying angles and about a common centroid of overlap are taken. Here we see 4 in all: 150L, 151L, 152L and 153L. It is given to be understood by the invention that many other slices of the photo could also be used, and not only in the asterisk-type formation. It is to be understood that the pixel slices are now converted into complex waveforms, and that a hologram is taken of each of the waveforms in accordance with the invention, either en masse squeezed into the fundamental of the coherent reference beam used, in a repeatable feeded sequence within successive wavelengths of the coherent reference beam used, or as the preferred embodiment each waveform holographed one at a time, and the resulting 4 holograms superimposed into one.
Figure 16:
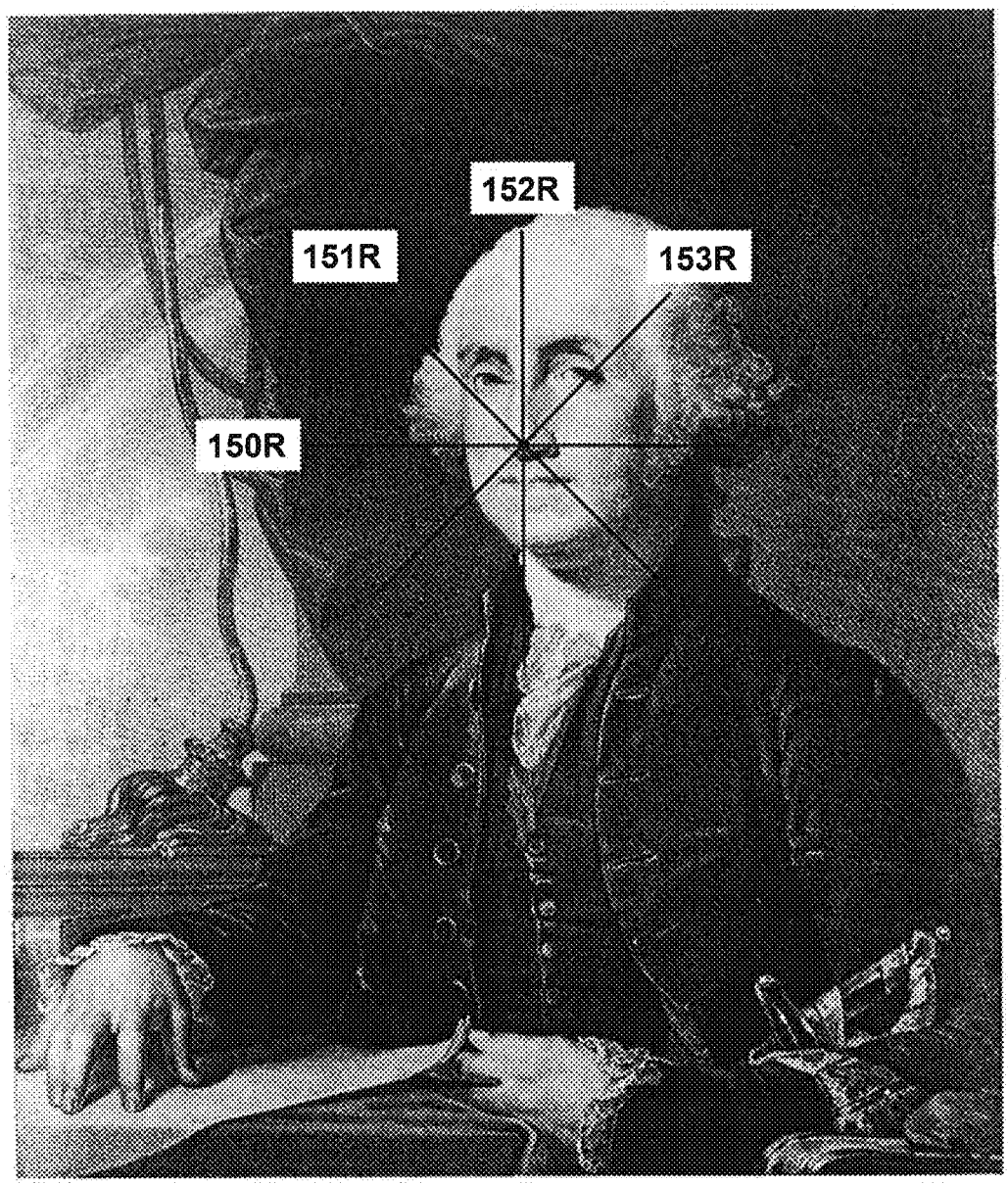
FIG. 16 is similarly situated to FIG. 15, but is of President George Washington, with similar cross-sectional waveform scans 150R, 151R, 152R, 153R, respectively. The figure is for practical illustration of course, and we must overlook that President Washington's face is slightly askew at an angle whereas Lincoln's glance is directly forward; and indeed it would be in best practice that it be direct forward also. Also, for practical illustration purposes we must overlook the relative size of the asterisk-configured-pixel-slice scanning field for the waveform collection with respect to FIG. 15 of Lincoln. In the best case scenario, the size of the respective scan fields of the objects being differentiated should be closely matched within practicality.
Figure 17:
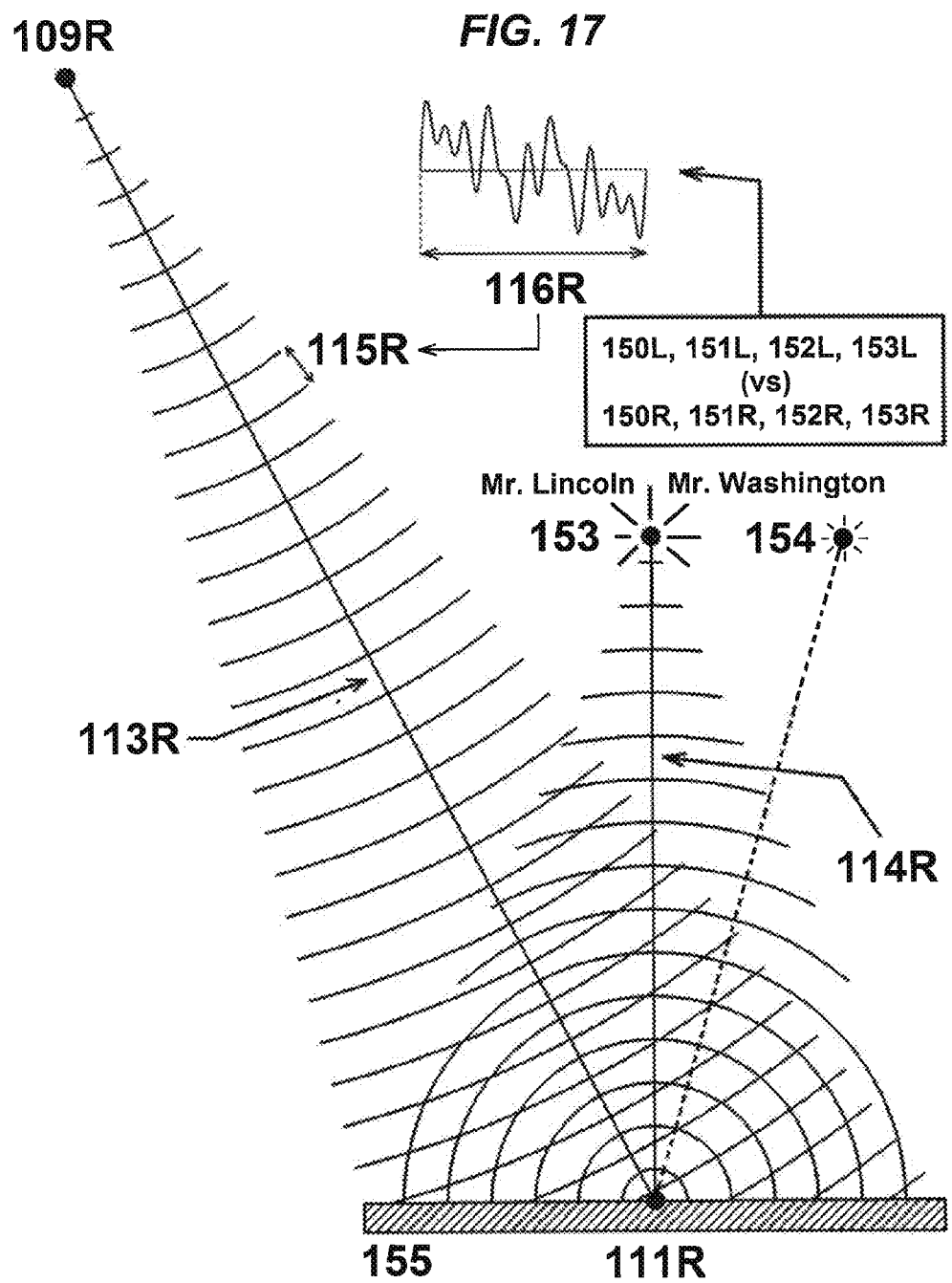
FIG. 17 shows two reconstructed singularity phantoms within the scope of the invention to illustrate the differentiation between two objects, in this case presidential photographs, or faces. 153 represents the spatial position of the recognition potential of the Lincoln photo of FIG. 15. 154 represents the same of what we are given to understand is a photo of President George Washington. 155 represents a superimposed hologram wherein two separate holograms, one each of Lincoln and of Washington—each in and of themselves being a superimposed complex waveform holograms of each photo respectively as described in FIG. 15—have been superimposed. If we are given to understand that the reconstructing reference beam—not shown for clarity sake—is modulated by the Lincoln pixel-slice waveforms, 150L through 153L; and that the reference beam bombards the hologram; and the phantoms of Lincoln and Washington sampled for reconstruction intensity and said intensity accumulated on each pass, then the figure demonstrates that the accumulated intensity of the Lincoln photo phantom singularity achieves a brighter glow than that of the Washington phantom singularity. If the reference beam used is modulated, rather, with the understood-to-exist Washington photo pixel-slice waveforms, then the opposite would prove true.
Figure 18:
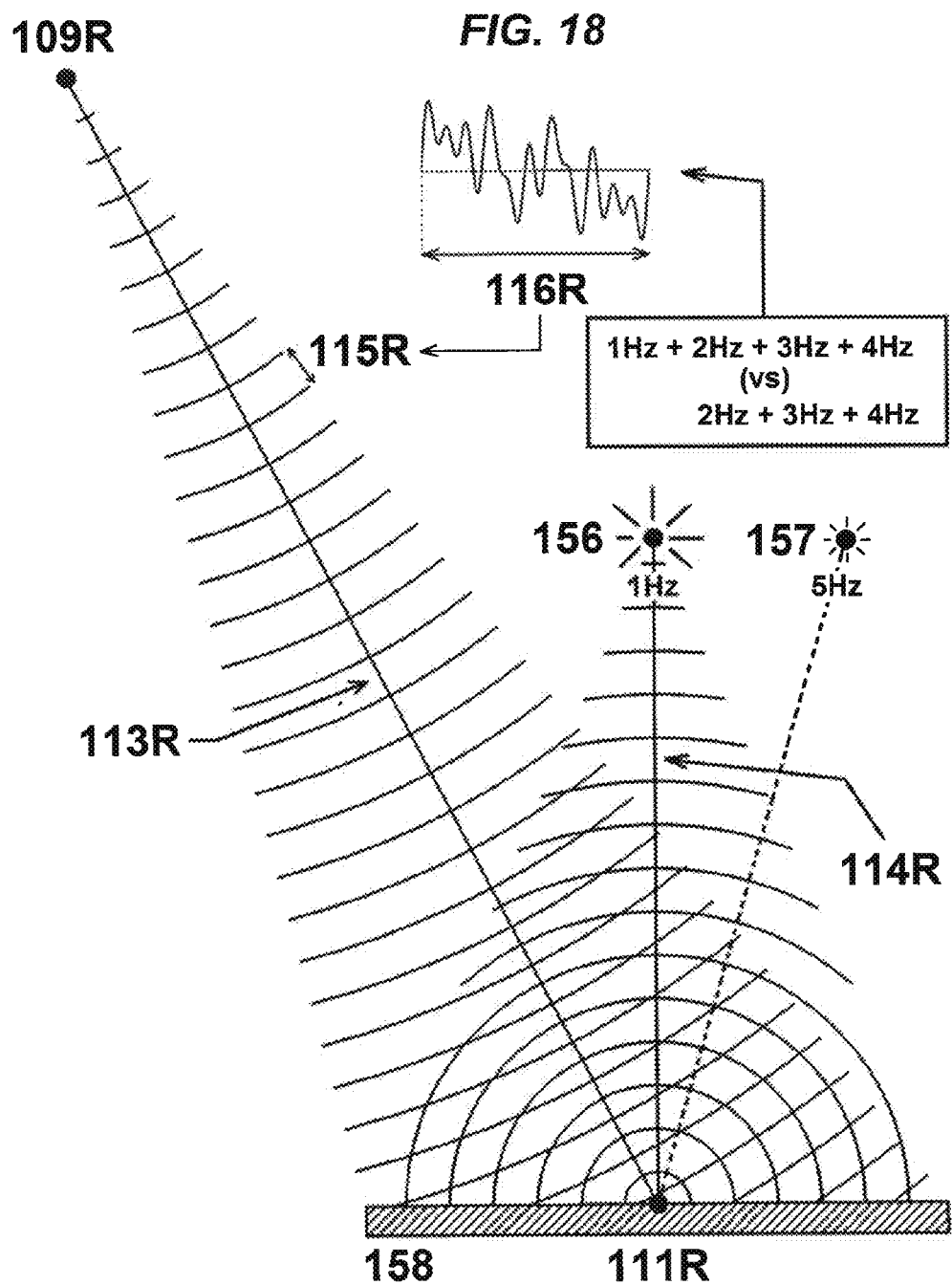
FIG. 18 shows a similar diagram to FIG. 17, only that instead of photographs being the identified with the phantom singularities, two harmonics are compared: 156 and 157 respectively, with 158 being the superimposed hologram or the individual unsuperimposed holograms involved. By thus holographing additional harmonics as additional singularity objects in different spatial positions, by superimposing the holograms thus generated, and by then later reconstructing their phantoms using said complex-waveform embedded coherent beams, the patterns of the reconstructed phantom points provide the basis for an infinite variety of interesting spectrum plots in n-dimensional space!
Figure 19:
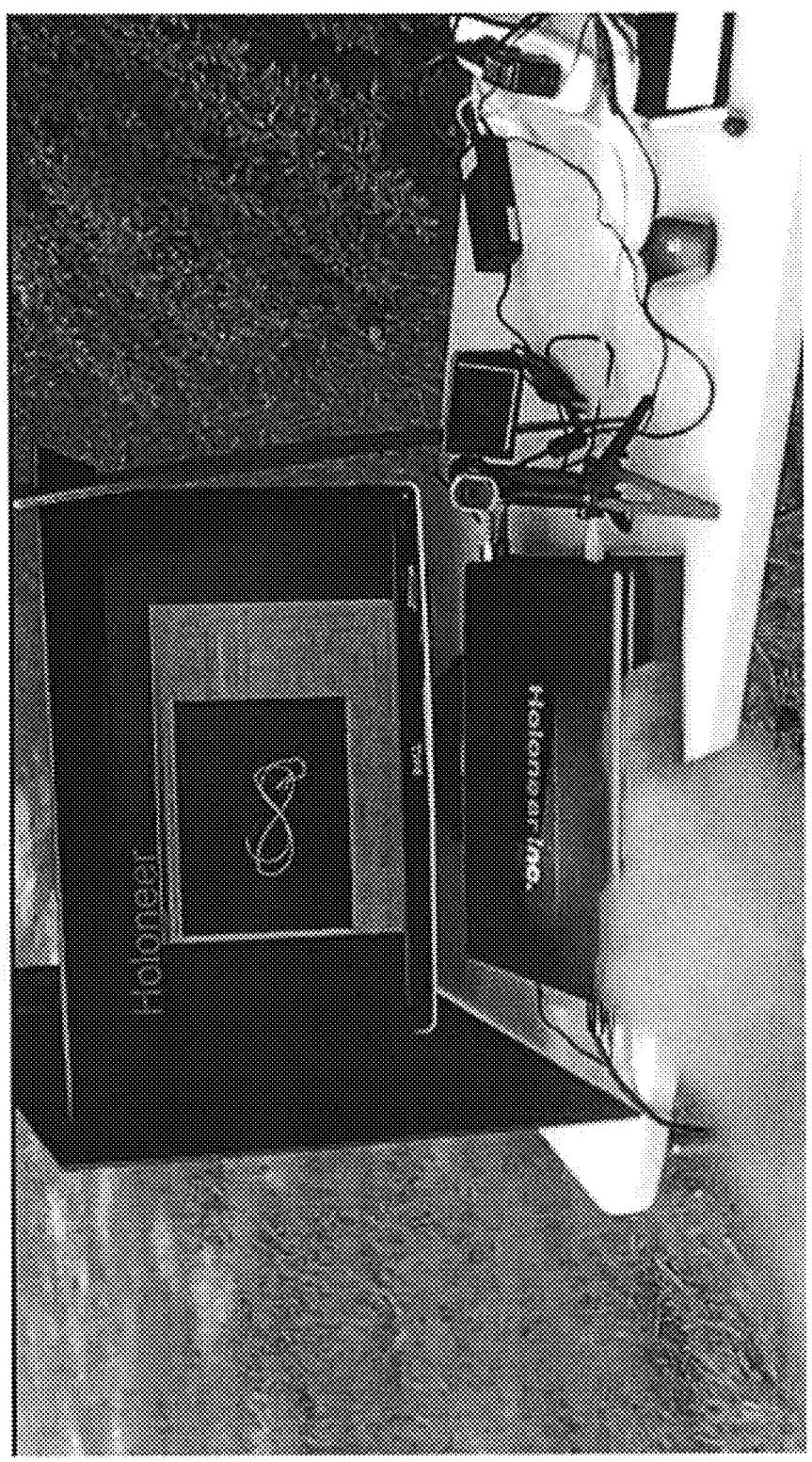
FIG. 19 shows a screen shot of a YouTube video where the progressive samples of the horizontal and vertical waveforms extracted by one of the differential analysis techniques described in the invention are applied as X, Y coordinate pairs to move the stroke of a pixel brush on screen without any artifice of scanner other than a simple video camera.
Figure 20:
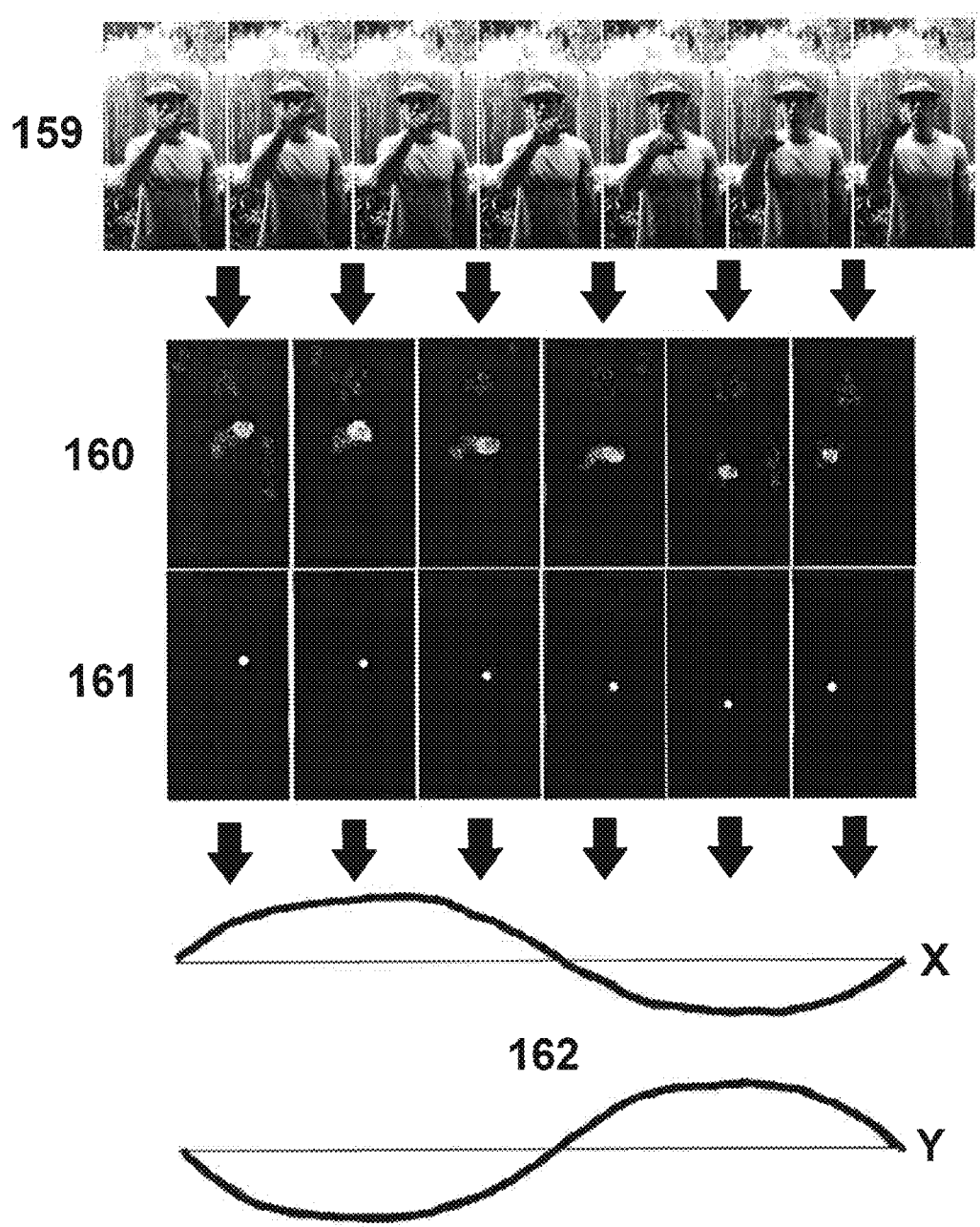
FIG. 20 shows a stream of 7 still images or video frames, 159, constituting a short motion picture of one of the inventors performing a motion with his right arm and hand altogether moving in free space such that his right index finger sweeps out a circular motion gesture. Using one of the algorithmic processes of the invention, the frames are analyzed for pixel changes between successive pairs and the pixel differentials, essentially motion differentials, are generated and stored, 160. Subsequently, the differential pixels' coordinates as well as their differential strengths are averaged into concentrated centroids or groups of concentrated centroids, 161. Finally the centroids are collected and run through the filtering processes mentioned in the invention so that they are smoothed out considerably from their raw state and in that same process are thus conjoined into waveforms, an X plot and a Y plot, respectively, 162. From here the waveforms are either stored or immediately applied for use by embedding or otherwise modulating the waveforms into coherent beams for frequency domain analysis by the holographic principle of the invention. As well, they may also be applied as the steering yoke signals to guide a cursor.

The primary goal of the invention is to differentiate actual waveforms as distinct objective entities or compressed singularities, so as to compare them compared with other waveforms also similarly compressed as singularities. Having this ability as a most powerful launch platform, if enough essential information is gathered from sensory intelligence or other vibratory data in the form of waveforms, it is absolutely possible to recognize complex objects, situations and events and other problems by use of the invention. Simply put, this is done by intelligently sampling the n-dimensional reconstruction space for objects and/or singularities and testing their phantom-glow strengths or even the average centroids of these strengths. This intelligent sampling can involve clusters, hierarchies, trees, pathways and the like, of objects or singularities. Many known data processing algorithms can be applied in such ventures. Thus it can entail many methodologies and internal applications, but require the use of the invention as the main core element of information processing. Thus, all of them as applications of the invention are within the spirit and scope of the invention.

Step 1: The source of coherent radiation is likened to that of a carrier wave and is modulated or is otherwise is embedded with the complex waveform which waveform is made to repeat itself within every undulation of the fundamental frequency of the coherent source; that is, the waveform repeats at every wavelength. This likens the source wave to a carrier wave and the waveform to a modulating wave, which is the basis of heterodyning in the field of radio communications.

Step 2: The waveform-modulated or waveform-embedded source as described in Step 1 above is then split into the conventional two parts used to record holograms, a reference beam and an object beam. The object beam illuminates one or more objects and the reflection and/or transmission of that wavefront is captured using a recording medium or electronic recording apparatus; for example, a camera or image sensor. The reference beam illuminates or otherwise impinges directly upon the recording medium. The interaction of the two beams at the recording medium generates an interference pattern.

Step 3: The interference pattern is subsequently illuminated by a source containing a complex waveform with the coherent carrier having generally the same fundamental frequency as the source described in Step 1 above which was used to make the original holographic recording. Recognition of the secondary waveform in terms of similarity or dissimilarity with respect to the original or primary waveform can be made by sampling the space at the position where the original object was illuminated with the original object beam. If the secondary waveform is similar to the original then there will be a greater energy measurement at the said sampling position. If the secondary waveform is dissimilar to the original then there will be a lesser energy measurement at the said sampling position.

The preferred embodiment of the apparatus described in Step 1, Step 2 and Step 3 above is that the process be carried out by means of an algorithm which simulates the recording and reconstruction processes of the described holographic operation involved by the use of pure mathematics such as by the use of dedicated electronic circuitry and/or conventional computing machinery such as an electronic computer system or systems each having one or more electronic processors, memory, one or more secondary storage devices, a stored program which embodies the algorithm, and suitable peripherals capable of at least supplying waveforms as input data and suitable peripherals that provide recognition detections as output data. In this embodiment the holographic recording can be a linear, planar, or higher multi-dimensional virtual surface. It can also be a point cloud. The objects which are illuminated can also be points. A general algorithm for this embodiment of the invention is provided in the drawings. It should be noted that the algorithm we provide is one example which achieves the results. To those skilled in the art and science of digital holography, our described invention may conceivably be duplicated using a variation of techniques known in the field to produce computer generated or digital holograms but with the goal results of recognition purposes centering around our technique of modulating or embedding the source. Therefore, the use of alternate means to achieve these results of generating and reconstructing a hologram where the source beam is embedded with or is modulated by a complex waveform should be considered as being circumscribed within the scope and spirit of this invention.

Alternatively, the process described in Step 1, Step 2 and Step 3 above can entail the physical process of an electronically, atomically, magnetically, or mechanically controllable wave source that produces a repetitive stream of vibrations amounting to a complex waveform containing simultaneously at least a fundamental and a sub-harmonic component, or alternatively at least two sub-harmonic components. The coherent source used can be one or more atomic or sub-atomic particles controlled by an electromagnetic energy process. It can also be a laser, maser, sound generator/speaker and/or any other electronic or physical source of mechanical or electromagnetic vibrations in which the said source is modulated by an electronic or other physical apparatus so as to include vibrations which equate for all practical purposes to the repetitive emission of the complex waveform. An electronic mixer and timing apparatus may be included for this purpose in order to control the beam so that the complex waveform is repetitively emitted at each undulation or wavelength interval.

Alternative to the method and apparatus described above, the complex waveform may be first Fourier analyzed at the outset. The spectral harmonics derived thereby may be then applied to individual coherent beams each having a differing wavelengths but which are appropriately proportionate with respect to the fundamental wavelength of the base coherent carrier vibration source used, where for proportioning purposes the fundamental wavelength of the base coherent carrier relates to the wavelength of the fundamental of the complex waveform itself. That is, the fundamental and odd and even sub-harmonics which are present in the waveform are derived by the said Fourier analysis and are then used to electronically control automatically by means of circuitry and switches the corresponding coherent sources of progressively shorter wavelengths which are relationally proportionate relative to the fundamental wavelength of the base coherent source. Additionally, the Fourier analysis provides an amplitude level for the fundamental and subharmonics of the analyzed waveform. These amplitude levels are also used to control the intensity of the respective said sources by means of circuitry and switches. In this configuration, the various coherent sources are aligned by means of mirrors or waveguides so that they emit their radiation along the same path.

The alternative physical process described above may also be achieved using a virtual process by the similar means of using an appropriate algorithm and electronic computing machinery as described above.

As to the software embodiments described above, an alternative variation may be used in which instead of one object or point in space being virtually illuminated with the waveform-modulated or waveform-embedded-coherent source, numerous objects or points in space are illuminated either at close or sparse proximity to each other. The numerous objects or points used during the recording process are then sampled during the subsequent reconstruction process in similar manner that the one is sampled. The collective samples can then be averaged for their collective intensities and the average intensity obtained thereby can be used as a more accurate detection of similarity or dissimilarity between the primary original waveform and subsequent secondary waveforms being tested for recognition.

In all the embodiments described above, numerous holographic recordings may be obtained on or within the same holographic recording medium, as by means of averaged superimposition. In this manner numerous waveforms may be associated with numerous objects and/or points in space so that a sophisticated network of recognition may be achieved within the same hologram where desired.

In all the embodiments described above, the source beam may be optionally moved in order to change the current category of recognition. That is, a series of holographic recordings may be made of numerable waveforms which belong to a certain category of recognition with the source beam being fixed in any given position. Where additional categories of recognition are desired, each may be recorded in turn by changing the position of the source beam. This additional technique makes it possible to position objects in space for one category of recognition which share the same collective space with other objects pertaining to another category of recognition. Reiterating, this is an optional variation of the invention and is not a limitation of the invention or requirement for distinguishing categories of recognition by the use of the invention.

The main thrust then becomes one of how to gather and provide the waveforms themselves. In this there are also numerous and multifarious approaches that can be used. Generally, it involves the basic concept extracting and/or filtering waveforms from sensory intelligence and other vibrational changes. An audio stream is an audio stream. It may be provided en masse or it may be provided in packets in terms of modulating or embedding the coherent reference beam. As for visual information, the problem becomes vastly more involved. There are numerous ways to do it and they too are all within the spirit and scope of this invention. To list them all would be impossible. Thus it should not be construed as a limitation on the invention to not list them. The bottom line is that any vibrational data, whether sensory or non-sensory, concrete or abstract, can be used by the invention to yield a solution by means of recognition. It is further noted that it may to may not be desirable to first remove the DC component from whatever waveform used prior to its embedding or modulation of the coherent beam used to generate the hologram.

Of particular interest however, there are two distinct categories of waveform intelligence extraction given by way of examples as follows:

Example 1

An n-dimensional visual image or motion picture may be broken up into linear or curvilinear or even volumetric-based pixel slices. This pixel slice contains spatial frequencies useful to analysis. Once obtained, the pixel slice is converted to one or more waveforms and is then applied by the invention to create and/or reconstruct objects or point singularities by way of holograms. In fact, an entire stream of images en masse can be converted to a waveform and used.

Example 2

As but one application of many available to it, the instant invention provides a practical means for analyzing one or more collectives of vibrational changes between frame-oriented packets of dynamic sensory information—visual, sonic, tactile etc.—or other vibrational forms of intelligence which are captured by means of transducers such as sensors. By this it is meant population coding: the taking of populations of vibrations and finding the average centroid. The vibrations are of an n-dimensional nature—X, Y, Z etc. vibrational dimensions then converted into waveforms and applied holographically in the usual manner of the invention. One would extract the waveforms generally as follows:

Step A: Information in one packet of information is differentially compared for changes between one or more adjacent, roughly contiguous, or further-removed neighbors, but which in most cases will be the preceding packet or frame. The term pixel has broad meaning within the scope of this procedure and does not necessarily imply visual pixels, but rather subdivisional unitary recording bodies (unitary bodies) of any kind. Roughly speaking, this comparison for change between frames or packets takes place on a one-for-one, pixel-for-pixel basis; however, the supplied unitary bodies presented which may be finite in nature as a given field of pixels or recording elements or memory spaces may be progressively expanded into further and further subdivisions or particles, ad infinitum, as desired. Therefore, the one-for-one comparison is the general rule, but not a limitation. The essence is that the unitary bodies or pixels in the packets or frames being compared to each other differentially have coordinates which correspond to each on a generally one-for-one basis with each other, and this same relationship also applies to the record of the differential analysis achieved, described below.

Step B: the pixels or unitary bodies that comprise the informational area or the n-dimensional volume of the said contiguous informational packets which are input and thus being compared, are individually set—or reset if negation is desired—depending on the difference value between them tripping a threshold value, which threshold value is supplied separately and is variable. Thus, if the threshold value is equated or passed by the difference value of the analysis, a switch or flag is set or reset—or the actual difference value itself or a filtered modification of it is stored—within a corresponding unitary body within a third, auxiliary packet which records the results of this differential analysis, and this occurs for each unitary body or pixel being compared within the said packets being compared. In other words, the third auxiliary packet is the differential of the two or more packets which have been so analyzed. In the invention proper, no name should be given to what this difference can be called beyond the fact that it is some form of dynamic change in and of itself. Altogether, these vibrations acquired are of a collective nature within the meaning of this invention. They are not to be narrowly construed as to which category of vibrations they are. Indeed, they may include entangled combinations of any of the following types: motion difference, color difference, amplitude difference, etc.

Step C: Subsequent to the differential analysis performed above, the auxiliary packet which stores that analysis is scanned as follows: (1) the set unitary bodies or pixels—or reset pixels if negation is desired—are tallied, quantified into a storage element or a counting variable; (2) As these particular pixels are counted, their location coordinates are likewise accumulated into separate storage elements or variables, one dimension being recorded per variable. It is noted here that although the record of change by means of the earlier-described differentiation may exist as the actual complete record of change by means of a complete third packet described, the record of change may alternatively exist in a more condensed format simply as being one or more storage elements or variables each of which separately records the accumulations of the various n-dimensional coordinates of the unitary bodies or pixels, with each one storage element or variable recording the accumulations of coordinates for a given pixel dimension. In the latter case, along with the coordinate accumulating elements, an additional element or variable is used to record the actual count or tally of those compared unitary bodies or pixels which by reason of comparison tripped the threshold and were set—or reset if negation was desired. However, if the subsequent analysis and conversion of the differentiation which is explained below, rather than being performed separately and subsequent to the above differentiation process, is performed simultaneously with it on the fly.

Step D: the accumulated populations are averaged by the tally of the counted differentials. The combination of these averaged population elements—coordinates—yields a centroid.

Step E: each individual centroid coordinate is likened to a charge pressure, or voltage. Each is applied to a filter-charge device such as an R-C capacitive circuit, or an L-C inductive circuit. Also, a selectively controlled transistor or drain resistor, perhaps combined with a transistor or other suitable microcontrollable device should be placed across the storage element so that the time constant can be manipulated as if the charge/discharge time stands still, holding the charging and discharging effect within the straight-line portion of the charging curve. The final output pressure or voltage of each individual circuit is then collected by means of an analog-digital converter and are sequenced together as the samples of the waveforms that are to be holographed, individually or collectively. These samples may first be further filtered or integrated by means of auxiliary apparatus. Alternatively, rather than using actual charging circuits, the dynamic charge equation (capacitor or inductor) can be used. In this case the value of t for time should be held in check as a constant. It should be held generally in the straight-line portion of the charge/discharge curve. This value of t can easily be derived based on the value of R with respect to L or C.

Step F: the process repeated as appropriate so as to continuously obtain samples to produce a waveform.

The horizontal and vertical waveforms of the algorithm described above may also applied to be used as an untethered means of a user being able to move a cursor about a screen by simply making movements in front of a camera. The derived horizontal waveform coordinates themselves, the samples of which taken as X, Y coordinate pairs, become the centroid of the cursor which will move over time in step with the horizontal and vertical waveforms when taken on a sample by sample basis. By subsequently analyzing the horizontal and vertical waveforms described using the holographic techniques described herein, it is possible to detect various complex gestures as distinguishable from others, including that of click and doubleclick, for instance.

What is claimed:

1. A method of recording holographic object data in a holographic recording medium by using a complex waveform as both an object beam and a reference beam, which provides phantom recordings of an original holographic data object, the method comprising:
   receiving a reference beam that includes a complex waveform, which was embedded with or modulated by a coherent fundamental wave and one or more harmonics thereof;
   receiving a complex wave front, which is a diffraction, reflection, or both, of the complex waveform used as the object beam in illuminating one or more objects for recording holographic data; and,
   recording an interference of the received reference beam and the received complex wave front, which produces an interference encoding of the one or more objects that includes a superimposition of the illuminated one or more objects at the coherent fundamental wave vibration and one or more phantom recordings thereof relative to the one or more harmonics in the complex waveform.

2. The method of claim 1, wherein the recording medium includes an electronic recording apparatus.

3. The method of claim 2, wherein the electronic recording apparatus includes one or more of a camera, motion sensor, image sensor, or audio recorder.

4. The method of claim 1, wherein the complex waveform used as both the reference beam and the object beam is generated by one or more electronic, atomic, magnetic, or mechanically controlled sources.

5. The method of claim 4, wherein the source used to generate the complex waveform produces one or more atomic or subatomic particles controlled by an electromagnetic energy process.

6. The method of claim 4, wherein the source used to generate the complex waveform includes one or more of a laser, maser, or sound generator.

7. The method of claim 4, wherein the source used to generate the complex waveform includes a computing device configured to simulate the fundamental wave vibration and one or more harmonics thereof using one or more peripherals capable of supplying waveforms as data inputs.

8. The method of claim 1 further comprising:
   illuminating the interference encoding of the one or more objects with a coherent source of a separate complex waveform, which produces one or more phantom glow energy strengths of interference encoding of the one or more objects relative to the one or more harmonics in the complex waveform;
   comparing the one or more phantom glow energy strengths generated by the separate complex waveform with those recorded using the original complex waveform; and based on the comparison, determining a similarity between the separate complex waveform and the original complex waveform.

9. The method of claim 8, wherein illumination of the interference encoding is part of a series of holographic recordings made from multiple complex waveforms of a specified type, and wherein the determined similarity is used as for differentiating between objects as part of an intelligent object recognition system.

10. The method of claim 1, wherein the complex waveform includes multiple sub-harmonics of the fundamental wave vibration.

* * * * *